(12) United States Patent
Watabe et al.

(10) Patent No.: US 11,299,105 B2
(45) Date of Patent: Apr. 12, 2022

(54) HOLDING DEVICE

(71) Applicant: PIONEER CORPORATION, Tokyo (JP)

(72) Inventors: Takashi Watabe, Saitama (JP); Hironori Shigeta, Saitama (JP); Hirofumi Matsumura, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 93 days.

(21) Appl. No.: 16/624,273

(22) PCT Filed: Jun. 12, 2018

(86) PCT No.: PCT/JP2018/022386
§ 371 (c)(1),
(2) Date: Dec. 18, 2019

(87) PCT Pub. No.: WO2018/235671
PCT Pub. Date: Dec. 27, 2018

(65) Prior Publication Data
US 2020/0114831 A1    Apr. 16, 2020

(30) Foreign Application Priority Data

Jun. 23, 2017  (JP) .............................. JP2017-122916

(51) Int. Cl.
*B60R 11/00* (2006.01)
*B60R 11/02* (2006.01)
*G06F 1/16* (2006.01)

(52) U.S. Cl.
CPC .......... *B60R 11/00* (2013.01); *B60R 11/0241* (2013.01); *B60R 11/0252* (2013.01); *G06F 1/1632* (2013.01); *B60R 2011/0005* (2013.01)

(58) Field of Classification Search
CPC ....... G06F 1/1632; B60R 11/02; B60R 11/00; B60R 11/0235; B60R 11/0252;
(Continued)

(56) References Cited

U.S. PATENT DOCUMENTS 8,708,296 B2 * 4/2014 Nemoto .................. B60R 11/02
248/346.06
2002/0064030 A1  5/2002 Shimizu
(Continued)

FOREIGN PATENT DOCUMENTS

JP    2002141677 A    5/2002
JP    2010132128 A    6/2010
(Continued)

OTHER PUBLICATIONS

International Search Report, dated Jul. 24, 2018, from corresponding PCT application No. PCT/JP2018/022386.

*Primary Examiner* — Nathan J Newhouse
*Assistant Examiner* — Matthew T Theis
(74) *Attorney, Agent, or Firm* — Nixon & Vanderhye

(57) ABSTRACT

A holding device for holding a held object is downsized to reduce an occupied space in an installation space. The holding device in which a holding mechanism for holding the held object is supported on a device main body so as to slidably project and retract includes a lock mounted on the holding mechanism and configured to lock the holding mechanism at an arbitrary projected position, the lock part including a first rotary body pivotally supported on the holding mechanism and configured to rotate upon application of certain operation, a second rotary body that rotates by a force directly or indirectly applied from the first rotary body by the rotation of the first rotary body, and an engagement part that moves between an engaged position at which the engagement part is engaged to the device main body and
(Continued)

a disengaged position by the rotation of the second rotary body.

14 Claims, 20 Drawing Sheets

(58) Field of Classification Search
CPC ..... B60R 2011/0085; B60R 2011/0082; B60R 2011/0071; B60R 2011/027; B60R 11/0258; B60R 2011/0084; B60R 11/0229; B60R 2011/0094; B60R 11/0241; B60R 2011/0005; H04M 1/04; H04M 1/11; H05K 5/02; H05K 5/0017
USPC .................................................. 224/281, 539
See application file for complete search history.

(56) References Cited

U.S. PATENT DOCUMENTS

| | | | |
|---|---|---|---|
| 2011/0185776 A1* | 8/2011 | Mahaffey | H05K 5/0204 70/58 |
| 2012/0049558 A1* | 3/2012 | Souillac | B60R 11/00 296/37.12 |

FOREIGN PATENT DOCUMENTS

| | | |
|---|---|---|
| JP | 2013256240 A | 12/2013 |
| JP | 2014091497 A | 5/2014 |

* cited by examiner

FIG. 23
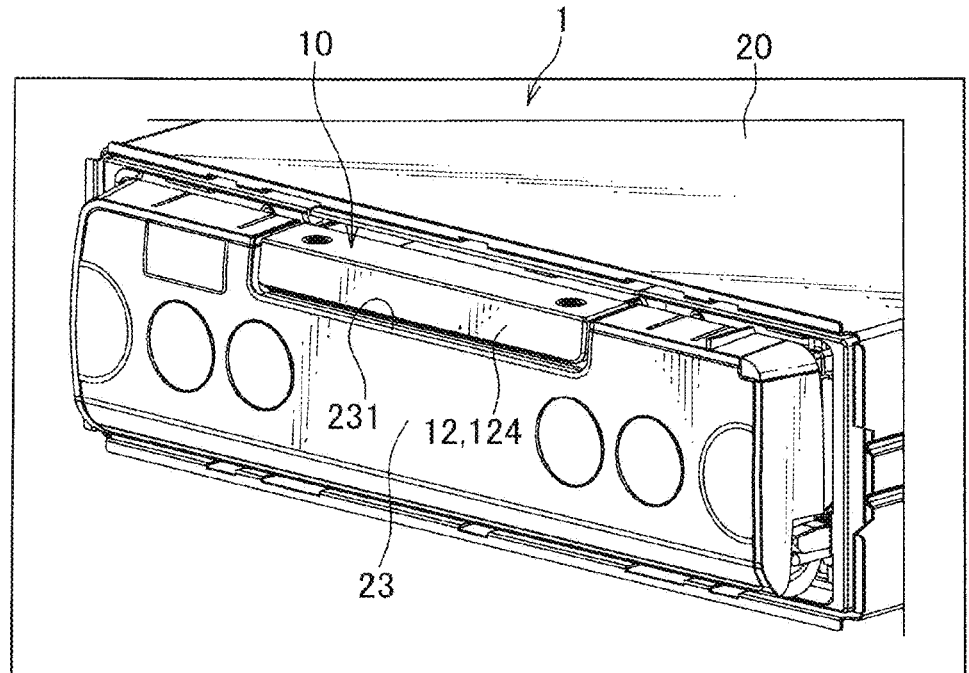
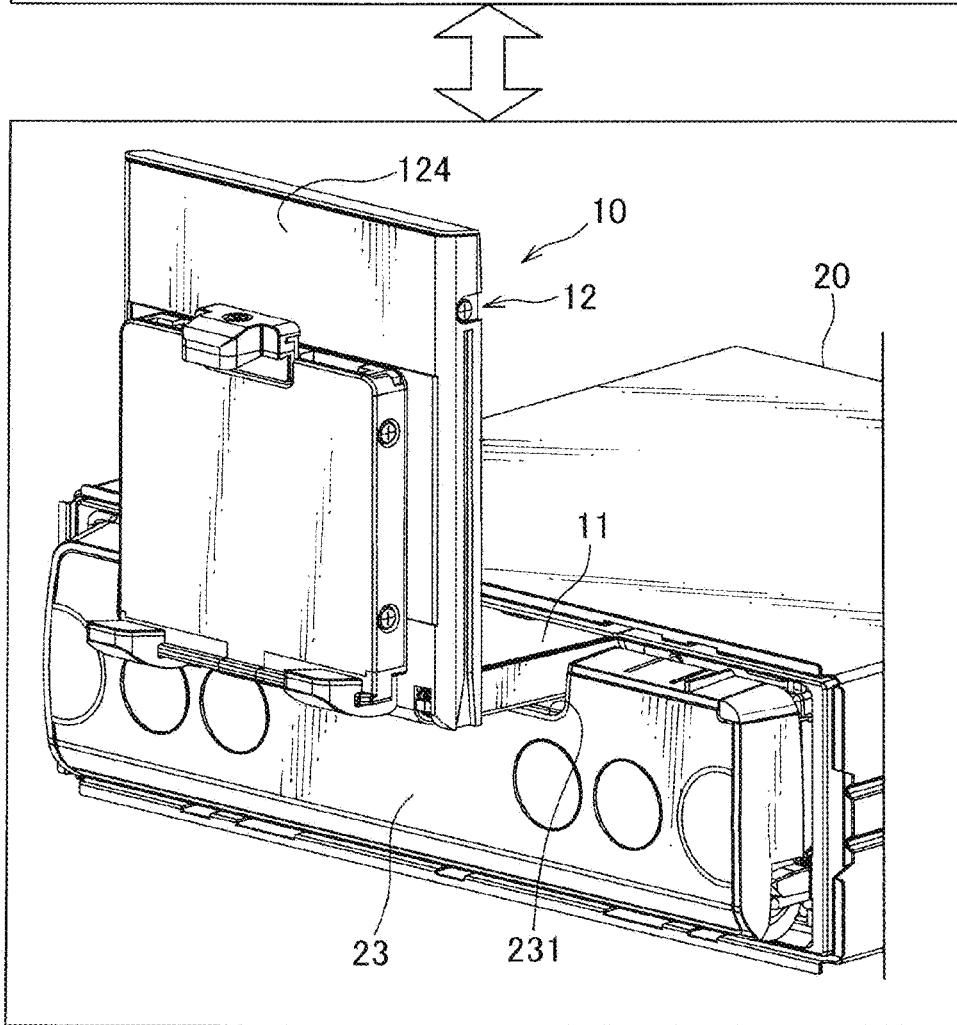

HOLDING DEVICE

TECHNICAL FIELD

The present invention relates to a holding device including a holding mechanism for holding a held object.

BACKGROUND ART

A holding device including a holding mechanism for holding a held object such as a smartphone and a tablet terminal is conventionally known (for example, refer to Patent Document 1). A holding device described in Patent Document 1 has a configuration in which a holding mechanism for holding a held object is rotatably supported on a tip end of an arm part that is rotatably supported on an attachment base. This holding device is used with the attachment base installed to a driver's seat and such of a vehicle, for example. During use, an orientation of the arm part and/or the holding mechanism at the tip end of the arm part is appropriately adjusted to an orientation desired by a user.

PRIOR ART DOCUMENT

Patent Document

Patent Document 1: JP 2013-256240 A

SUMMARY OF THE INVENTION

Problem to be Solved by the Invention

The holding device described in Patent Document 1 is a large-scale device including the attachment base, the arm part and the holding mechanism as described above, and occupies a large space at the installation place such as the driver's seat of the vehicle, for example.

Therefore, one example of an object of the present invention is to provide a holding device for holding a held object that can be downsized to reduce an occupied space at an installation place.

Solution to the Problem

In order to achieve the above-mentioned object, the present invention provides, in a first aspect, a holding device in which a holding mechanism for holding a held object is supported on a device main body so as to slidably project and retract, the holding device includes, a lock part mounted on the holding mechanism and configured to lock the holding mechanism at an arbitrary projected position, wherein the lock part includes a first rotary body pivotally supported on the holding mechanism and configured to rotate by application of certain operation, a second rotary body configured to rotate by a force directly or indirectly applied from the first rotary body by the rotation of the first rotary body, and an engagement part configured to move between an engaged position at which the engagement part is engaged to the device main body and a disengaged position by the rotation of the second rotary body.

BRIEF DESCRIPTION OF THE DRAWINGS

FIG. 23 shows a front perspective view of the holding device shown to illustrate the advantageous effect on the appearance of the holding device which can be provided by reducing the thickness of the base part.

DESCRIPTION OF EMBODIMENTS

Figure 1:
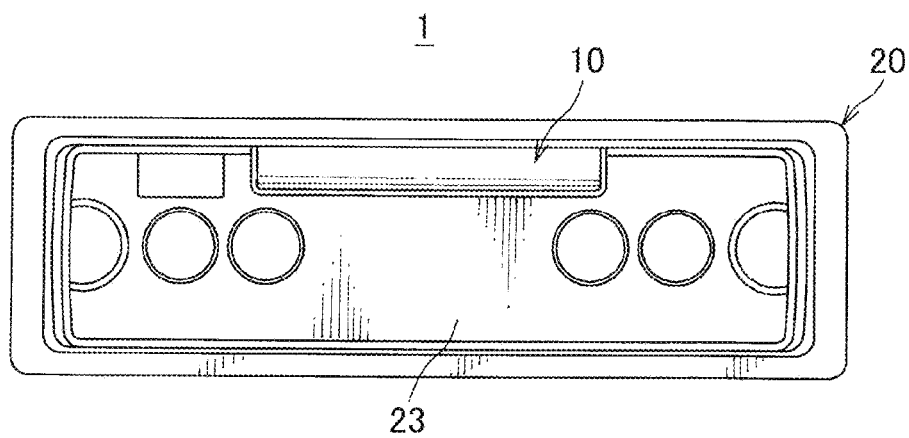
FIG. 1 is a front view showing a holding device according to an embodiment of the present invention.

The following will explain an embodiment of the present invention. A holding device according to the embodiment of the present invention is a holding device in which a holding mechanism for holding a held object is supported on a device main body so as to slidably project and retract. This holding device includes a lock part mounted to the holding mechanism and configured to lock the holding mechanism at an arbitrary projected position. This lock part includes a first rotary body, a second rotary body and an engagement part as described below. The first rotary body is pivotally supported on the holding mechanism and configured to rotate by application of certain operation. The second rotary body is configured to rotate by a force directly or indirectly applied from the first rotary body by the rotation of the first rotary body. The engagement part is configured to move between an engaged position at which the engagement part is engaged to the device main body and a disengaged position by the rotation of the second rotary body.

According to the holding device of this embodiment, a mechanism in the lock part that transmits the certain operation to the engagement part is constituted of a plurality of rotating elements including the first rotary body and the second rotary body, thus, for each of the rotating elements, its length can be reduced and the moving distance of its rotating end can be reduced. A thickness of the holding mechanism for holding the held object becomes thickest when the lock part is mounted such that the rotating direction of the rotating elements correspond to a thickness direction of the holding mechanism. According to the holding device of this embodiment, since the moving distance of the rotating end of the rotating element is reduced as described above, the thickness of the holding mechanism can also be reduced, thereby the holding device can be downsized to reduce an occupied space in an installation place.

In the holding device of this embodiment, the lock part further includes a biasing member configured to bias the engagement part to the engaged position. Consequently, for example during use in which the held object is held by the holding mechanism and used, the engagement part is always biased and engaged to the device main body, thus the held object can be used in a stable state.

Further, in the holding device of this embodiment, the first rotary body is configured to, when moving the engagement part to the disengaged position against a biasing force of the biasing member, make the second rotary body rotated by applying a force to the second rotary body by the rotation of the first rotary body. On the other hand, when the engagement part moves to the engaged position by the biasing force, the first rotary body rotates so as not to obstruct the rotation of the second rotary body by the biasing force applied via the engagement part. Consequently, since the biasing force is used for the movement of the engagement part to the engaged position, the consideration only needs to be given to move the engagement part to the disengaged position regarding the transmission of the force to the engagement part by the first rotary body and the second rotary body. Consequently, the mechanism configuration regarding the transmission of the force can be simplified, thereby reducing the cost and labor for manufacturing and assembling the holding device.

Further, in the holding device of this embodiment, the device main body is provided with a to-be-engaged body including a plurality of to-be-engaged parts arranged in a projecting and retracting direction of the holding mechanism, and the engagement part is configured to engage to the to-be-engaged body. By using the to-be-engaged body having the plurality of to-be-engaged parts linearly-arranged in the projecting and retracting direction, an accommodation space can be reduced also for the engagement mechanism of the engagement part of the holding device. Consequently, according to the holding device of this embodiment, the holding device can be further downsized.

Further, the holding device of this embodiment further includes a second lock part provided to the device main body and configured to lock the holding mechanism that has been retracted in the device main body to an accommodated position. Consequently, the holding mechanism can be stably accommodated to the accommodated position.

Further, in the holding device of this embodiment, the holding mechanism includes a base part supported on the device main body so as to slidably project and retract, and a holding part pivotally supported on the base part and configured to hold the held object. Moreover, the certain operation is rotating operation that rotates the holding part with respect to the base part. Consequently, operation by a user to make the held object held, which is the rotation of the holding part, is used as operation for locking and unlocking by the movement of the engagement part. Consequently, as compared to the case of, for example, separately providing an operation button and such for achieving locking and unlocking, the manufacturing cost can be reduced due to the reduction in the number of components and such.

Further, in the holding device of this embodiment, the device main body may be configured to be mounted on a vehicle, and the held object may be a mobile device. The mobile device as used herein is an electronic device which can be carried by a user, an example of which includes a smartphone, a tablet terminal, a game device and such.

Embodiment

In the following, an embodiment of the present invention is explained in detail with reference to the drawing. A holding device of this embodiment is a vehicle-borne device, and is mounted to an instrumental panel at a driver's seat of a vehicle and used. Further, the holding device of this embodiment is configured to hold a smartphone as a held object as one example of a mobile device.

Figure 2:
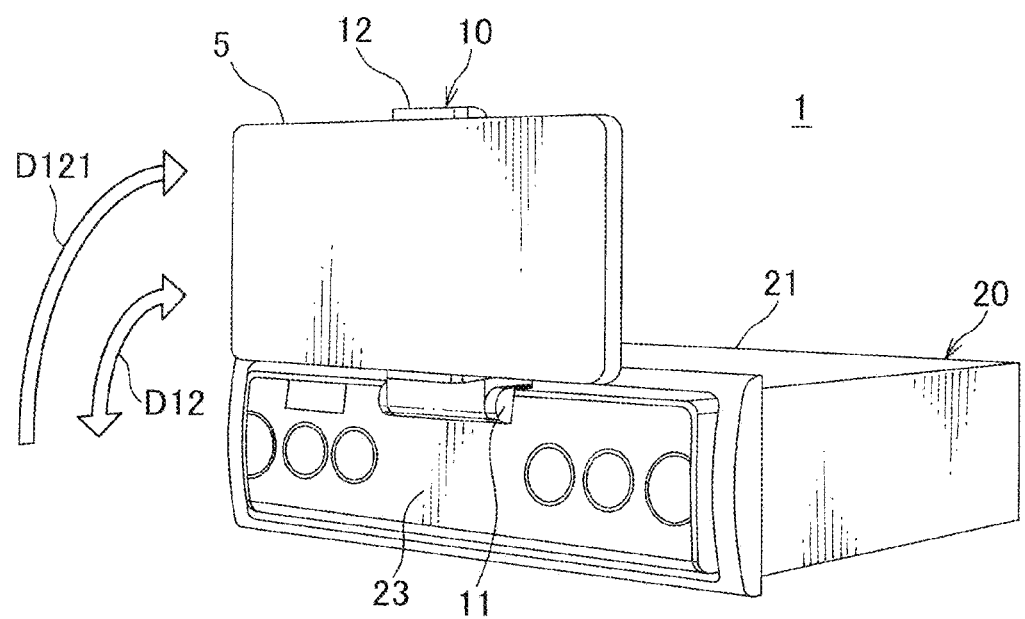
FIG. 2 is a perspective view showing a state where a smartphone is held by the holding device shown in FIG. 1.
Figure 3:
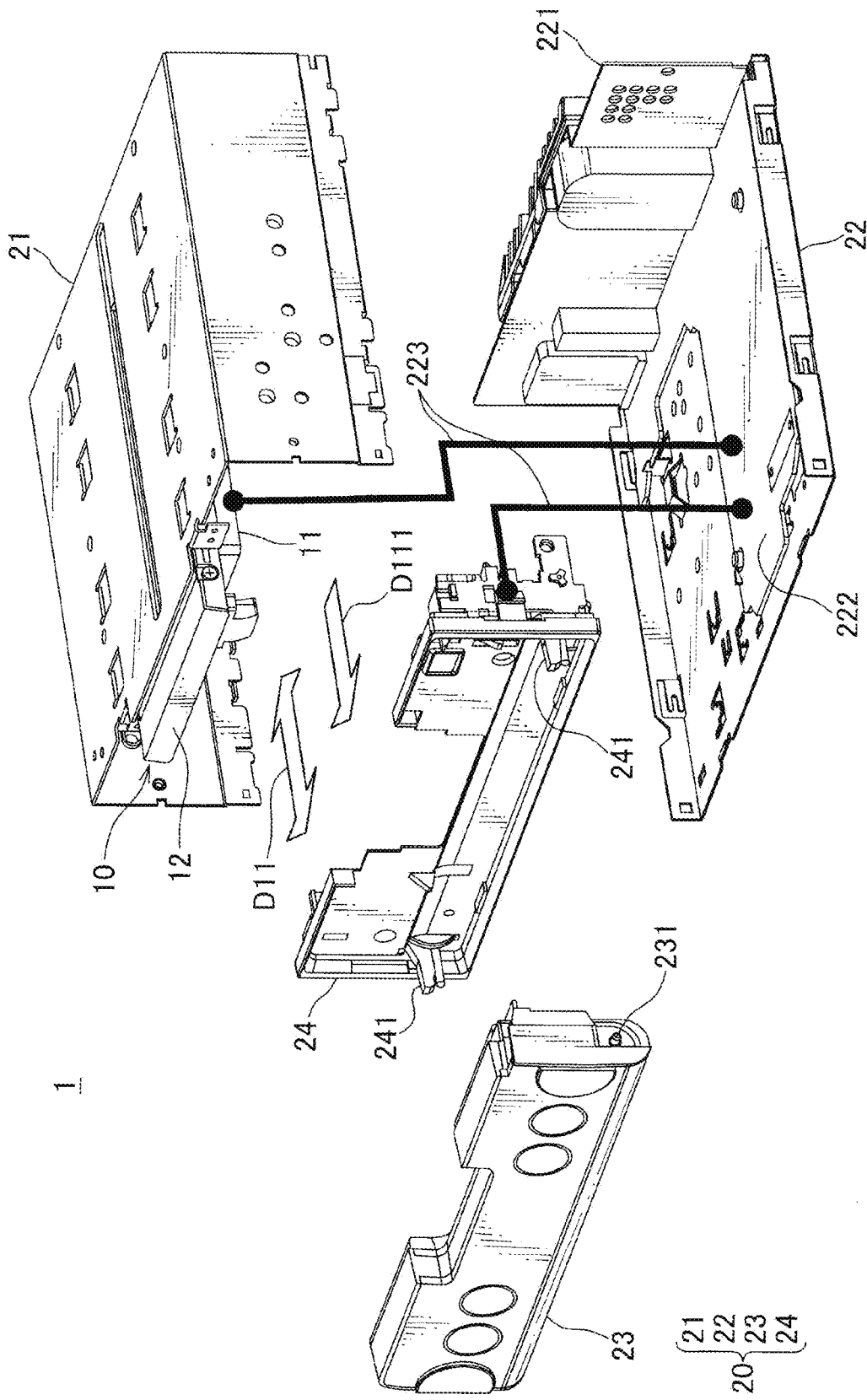
FIG. 3 is an exploded perspective view of the holding device shown in FIG. 1.

FIG. 1 is a front view showing the holding device according to the embodiment of the present invention, FIG. 2 is a perspective view showing a state where the smartphone is held by the holding device shown in FIG. 1, and FIG. 3 is an exploded perspective view of the holding device shown in FIG. 1.

The holding device 1 of this embodiment includes the holding mechanism 10 for holding the smartphone 5, and a rectangular box-shaped device main body 20 to be mounted to an instrumental panel.

The holding mechanism 10 is held by the device main body 20 so as to freely project and retract. Further, the holding mechanism 10 includes a base part 11 supported on the device main body 20 so as to slidably project and retract, and a holding part 12 pivotally supported on this base part 11 and configured to hold the smartphone 5. To make the holding mechanism 10 hold the smartphone 5, the base part 11 is drawn out from the device main body 20 in a projecting direction D11 in a projecting and retracting direction D11 shown in FIG. 3, and the holding part 12 is erected in an erecting direction D121 in a rotating direction D12 shown in FIG. 2. The smartphone 5 is then held by this erected holding part 12.

The device main body 20 includes an upper chassis 21 constituting an upper wall and a pair of side walls of the rectangular box-shaped device main body 20, and a lower chassis 22 constituting a lower wall. The base part 11 of the above-described holding mechanism 10 is supported on the upper wall of the upper chassis 21 so as to slidably project and retract. The lower chassis 22 is provided with a rectangular box-shaped back base plate 221 erected from one end side on a back side of the rectangular box-shaped device main body 20 and constituting a back wall of the device main body 20. This back base plate 221 is mounted with a connector of various type for connection with an external device, and/or an antenna and such for performing a short-distance communication according to, for example, Bluetooth (registered trademark) standard and such, with the smartphone 5. Further, an inner base plate 222 electrically connected to the back base plate 221 is attached to an inner face of the lower chassis 22.

Further, the device main body 20 includes a rectangular plate-shaped, detachable front panel part 23 constituting a front wall of the device main body 20 and serving as a user interface, and a panel part 24 configured to detachably and rotatably hold the front panel part 23. The panel part 24 is fixed to the upper chassis 21 and the lower chassis 22. This panel part 24 is formed into a shape having a cutout, so as not to interfere with the holding mechanism 10 supported on the upper chassis 21. A pair of shaft protrusions 231 constituting a rotation axis is provided on both sides of the front panel part 23 in a longitudinal direction, and this pair of shaft protrusions 231 is detachably and rotatably held by a pair of holding arms 241 of the panel part 24.

In the holding device 1 of this embodiment, each of the holding mechanism 10 supported on the upper chassis 21 and the panel part 24 is electrically connected to the inner base plate 222 of the lower chassis 22 via a cable 223. In this embodiment, touch operation with respect to the smartphone 5 held as shown in FIG. 2 and button operation with respect to the front panel part 23 can display map information on a display of the smartphone 5 and can play music from an in-vehicle audio device, for example. Also, the held smartphone 5 can be charged via the cable 223 connecting the holding mechanism 10 and the inner base plate 222, and a charge cable extending from the smartphone 5 and connected to the holding mechanism 10.

The smartphone 5 is held by the holding device 1 described above according to the following procedure.

Figure 4:
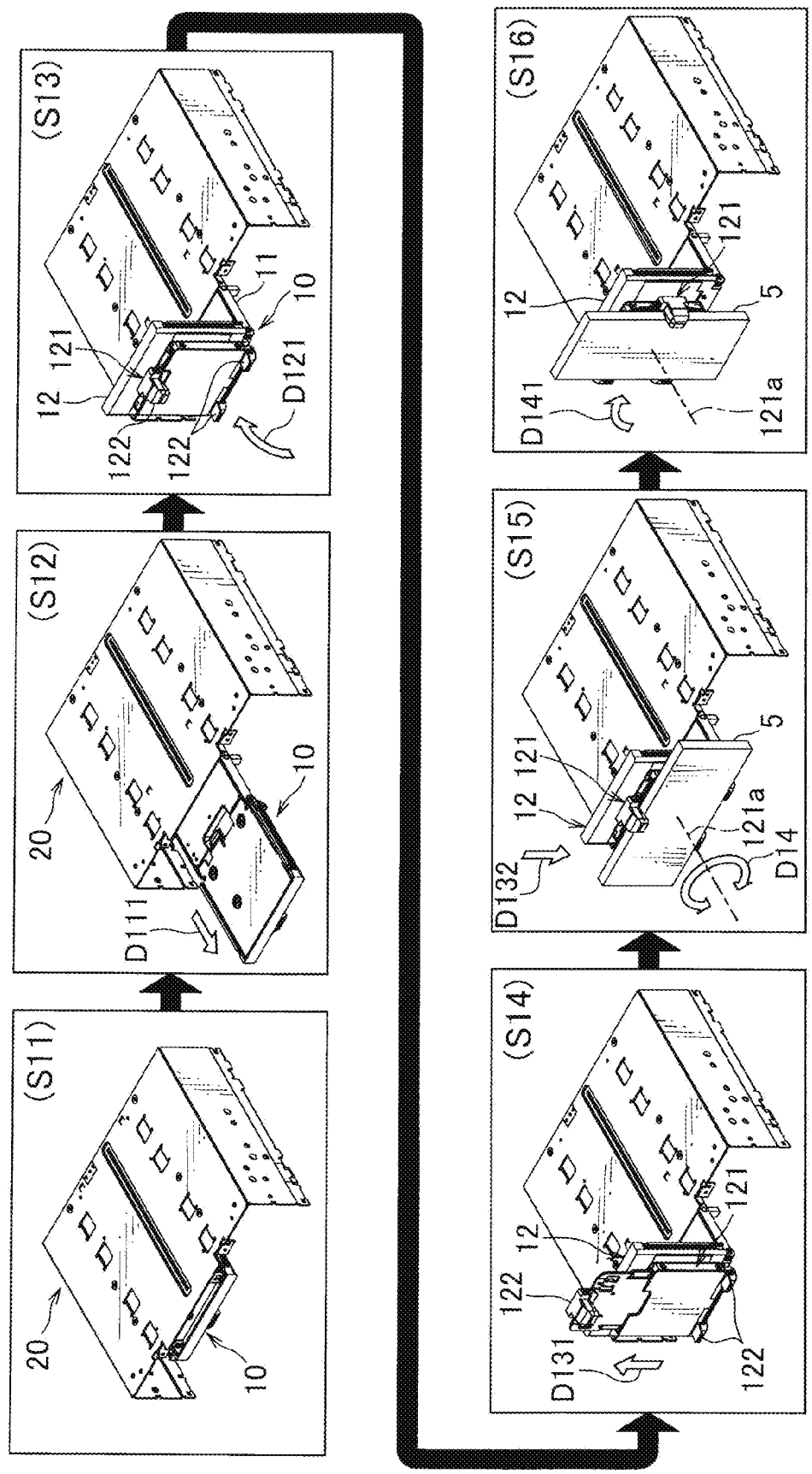
FIG. 4 is a schematic diagram illustrating one exemplary procedure to make the smartphone held by the holding device shown in FIG. 1 to FIG. 3.

FIG. 4 is a schematic diagram illustrating one exemplary procedure to make the smartphone held by the holding device shown in FIG. 1 to FIG. 3. In FIG. 4, with respect to the device main body 20, only the upper chassis 21 is shown for simplicity. The procedure explained below is performed manually by a user.

Firstly, in step S11 and step S12, the holding mechanism 10 is drawn out from the device main body 20 in the projecting direction D111. At this time, in this embodiment, the front panel part 23 is either rotated around the shaft protrusion 231 shown in FIG. 3 as a rotation center and tilted forward, or removed from the panel part 24, so as not to obstruct the movement of the holding mechanism 10.

In subsequent step S13, in the holding mechanism 10, the holding part 12 is erected with respect to the base part 11 in the erecting direction D121. At this time, the holding part 12 includes a chucking part 121 having three holding claws 122. In this embodiment, in this step S13 where the holding part 12 is erected, the chucking part 121 is positioned such that one holding claw 122 is located on an upper portion side and two holding claws 122 are located on a lower portion side. Further, in the chucking part 121, one holding claw 122 on the upper portion side is biased by a spring toward two holding claws 122 on the lower portion side.

In step S14, the holding claw 122 on the upper portion side is raised in a raising direction D131 against this biasing force of the spring at the chucking part 121.

Then, in step S15, the smartphone 5 is positioned between the holding claw 122 on the upper portion side which has been raised as described above and the holding claws 122 on the lower portion side, in a laterally-arranged fashion with a longitudinal direction of the smartphone 5 extending in a horizontal direction. Once the user releases the holding claw 122 on the upper portion side, the holding claw 122 on the upper portion side moves in a descending direction D132 due to the above-described biasing force of the spring. Thus, the smartphone 5 is sandwiched by the holding claw 122 on the upper portion side and the holding claws 122 on the lower portion side.

In this embodiment, in the holding part 12, the chucking part 121 is attached so as to freely rotate around a rotation axis 121a in the rotating direction D14. As described above, in step S15, the smartphone 5 is held in the laterally-arranged fashion. If the user wishes to see a display screen with the smartphone 5 arranged in a vertically-arranged fashion in which the longitudinal direction of the smartphone 5 extending in a vertical direction, then the smartphone 5 can be arranged in the vertically-arranged fashion in the next step S16. That is, in step S16, the chucking part 121 together with the smartphone 5 is rotated around the rotation axis 121a for 90 degrees in the rotating direction D141, i.e., a clockwise direction in the drawing. This rotation movement positions the smartphone in the vertically-arranged fashion. If the user subsequently wishes to see the display screen with the smartphone 5 arranged in the laterally-arranged fashion, then the chucking part 121 is rotated back in a counterclockwise direction in the drawing, and the smartphone 5 is arranged in the laterally-arranged fashion. It is noted that the rotating direction of the chucking part 121 may be set to be opposite with respect to this embodiment.

Further, in this embodiment, the user may bring back the front panel part 23 at an arbitrary timing after the holding mechanism 10 is drawn out. As a result, an appearance after the smartphone 5 is held will be the one shown in FIG. 2, for example.

When removing the smartphone 5 and accommodating the holding mechanism 10 within the device main body 20, the holding mechanism 10 is accommodated according to a reverse procedure to the procedure shown in FIG. 4.

Next, the following will explain a structure in which the holding mechanism 10 is supported on the device main body 20 so as to slidably project and retract.

Figure 5:
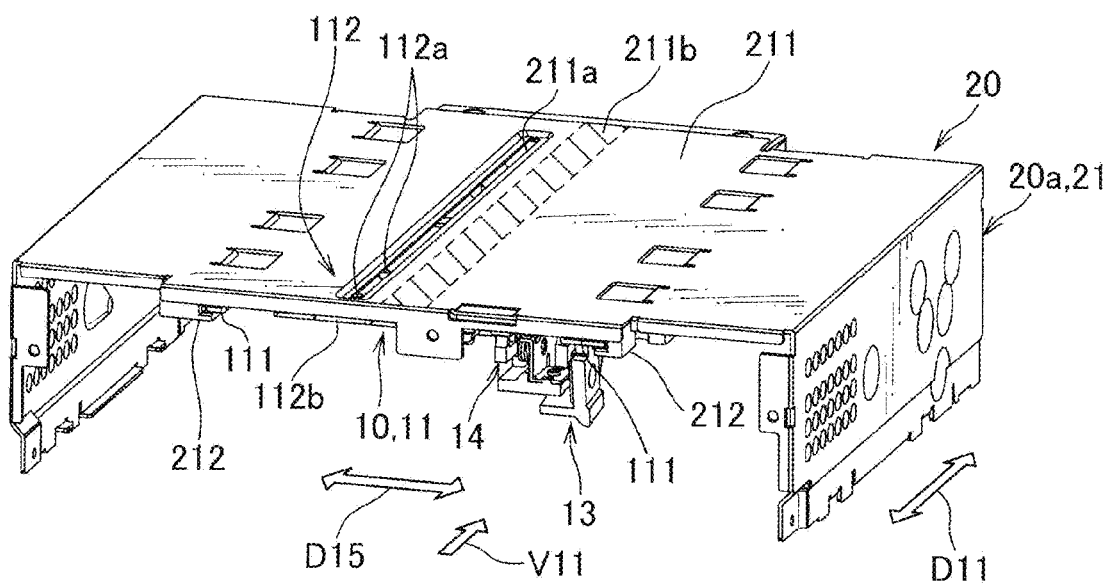
FIG. 5 is a perspective view showing a structure for supporting the holding mechanism on a device main body so as to slidably project and retract.
Figure 6:
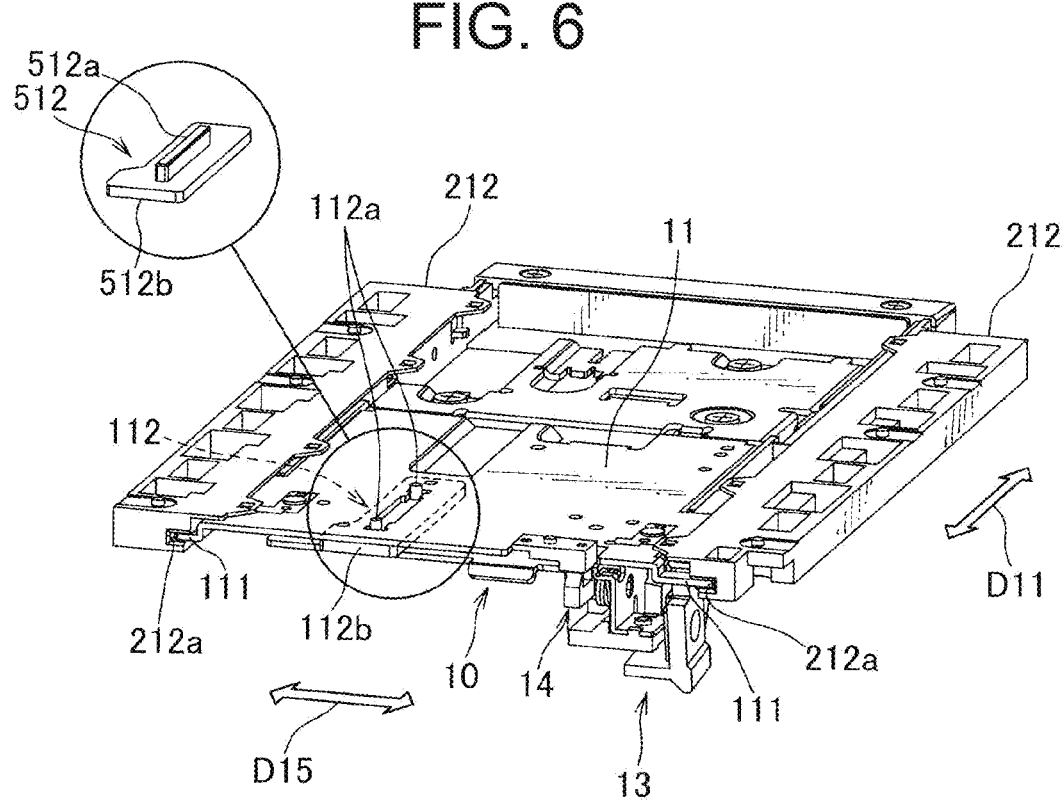
FIG. 6 is a perspective view of the structure shown in FIG. 5 in which an upper chassis is omitted.

FIG. 5 is a perspective view showing a structure for supporting the holding mechanism on the device main body so as to slidably project and retract. FIG. 5 shows the above-mentioned structure with the upper chassis 21 supporting the holding mechanism 10 viewed from a back side of the holding device 1. Further, FIG. 6 is a perspective view of the structure shown in FIG. 5 in which the upper chassis is omitted.

The upper chassis 21 of the device main body 20 is a component obtained by processing a sheet metal, and constitutes a metallic housing 20a of the device main body 20 together with the lower chassis 22 (refer to FIG. 3) obtained similarly by processing a sheet metal. A pair of slide supporting parts 212 on which the holding mechanism 10 is supported so as to slidably project and retract, is provided to an inner face of an upper face part 211 of this upper chassis 21. The slide supporting part 212 is a resin molded component. Each slide supporting part 212 is provided with a support groove 212a extending in the projecting and retracting direction D11, and both ends 111 of the base part 11 of the holding mechanism 10 in a right-left direction D15 intersecting the projecting and retracting direction D11 are fitted into the support grooves 212a, respectively. In this manner, the holding mechanism 10 is supported so as to slidably project and retract.

A guide groove 211a extending in the projecting and retracting direction D11 of the holding mechanism 10 is provided to the upper face part 211 of the upper chassis 21 so as to penetrate in a slit-like shape. Further, the base part 11 of the holding mechanism 10 is provided with a protruding member 112 which has two protrusions 112a arranged in the projecting and retracting direction D11 and which is protruding from the holding mechanism 10 and inserted into the guide groove 211a. This protruding member 112 is constituted of a rectangular sheet metal 112b and the two round rod-shaped metallic protrusions 112a erected from the sheet metal 112b.

In this embodiment, the support of the holding mechanism 10 by the pair of slide supporting parts 212 permits some degree of backlash in the right-left direction D15. The holding mechanism 10 is configured to slide so as to project and retract in the projecting and retracting direction D11 with this backlash in the right-left direction D15 being restricted by the guide groove 211a and the protruding member 112.

The protruding member provided to the base part 11 is not limited to the protruding member 112 having the two protrusions 112a as the one shown in this embodiment. FIG. 6 shows a protruding member 512 according to another embodiment which may be employed in place of the protruding member 112 of this embodiment. This protruding member 512 of the another embodiment includes a rib-shaped metallic protrusion 512a which is formed long in the projecting and retracting direction D11 and which is erected from a rectangular sheet metal 512b.

Further, in this embodiment, the guide groove 211a on the upper face part 211 of the upper chassis 21 is positioned near a central region 211b in the right-left direction D15. This is because the central region 211b in the right-left direction D15 on the upper face part 211 is utilized as a held region which is held by a fixation structure on the instrumental panel side when the holding device 1 is mounted to the instrumental panel. The guide groove 211a is provided as close as possible to the center while keeping out from the central region 211b as the held region. By providing the guide groove 211a close to the center, the protruding member 112, i.e., the holding mechanism 10, can be guided in the projecting and retracting direction D11 in a well-balanced fashion with respect to the right-left direction D15.

The guide groove for the protruding member is not limited to the guide groove 211a of this embodiment positioned near the central region 211b in the right-left direction D15. For example, if there is no positional restriction due to the fixation structure and such on the instrumental panel side, then the guide groove 211a may be positioned in the central region 211b in the right-left direction D15 to perform guiding in a further well-balanced fashion.

Furthermore, in this embodiment, the holding mechanism 10 is mounted with a projection lock part 13 (lock part) configured to lock the holding mechanism 10 at an arbitrary projected position, and an accommodation lock part 14 (second lock part) configured to lock the holding mechanism 10 at an accommodated position.

Figure 7:
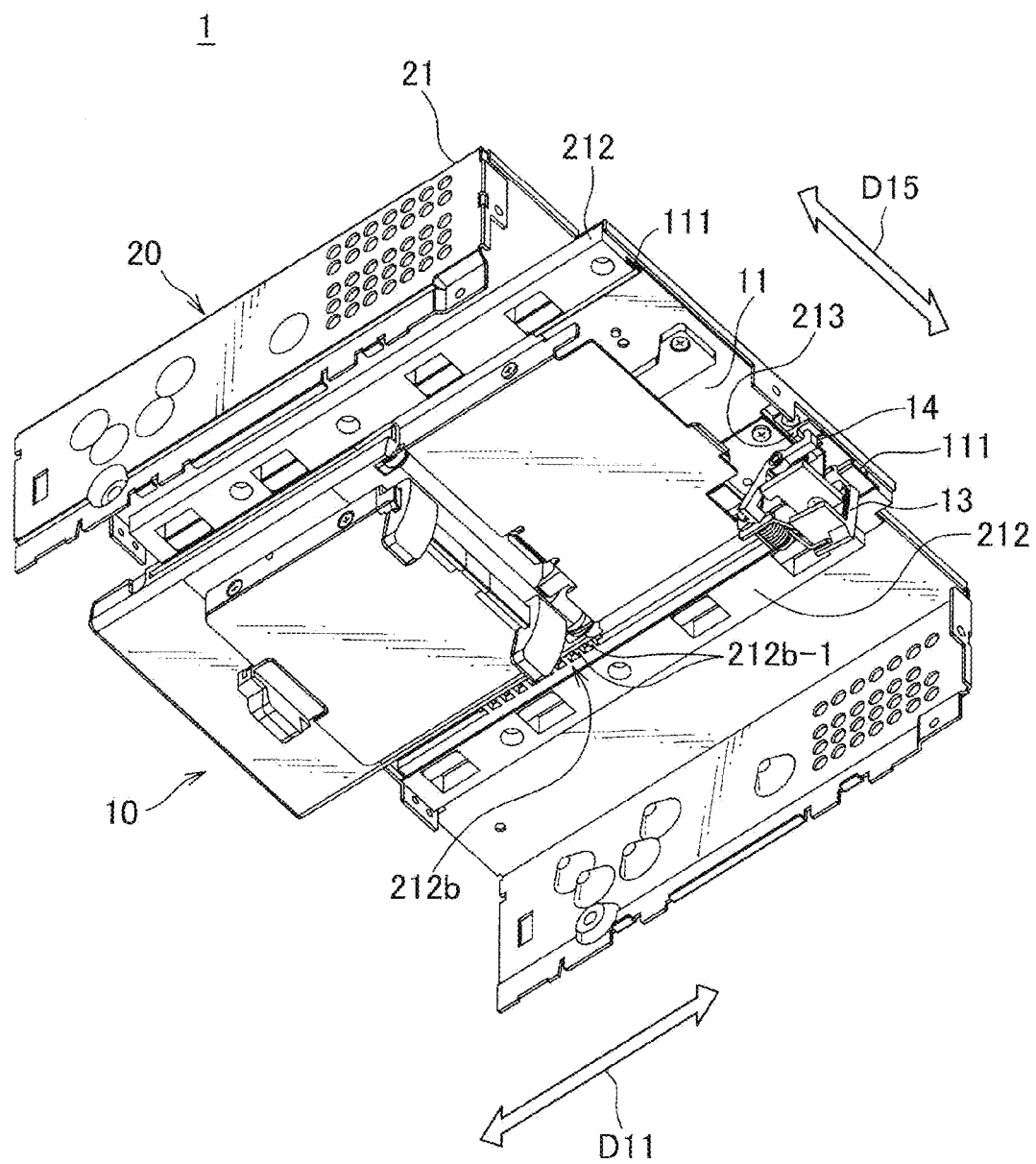
FIG. 7 is a perspective view showing a projection lock part and an accommodation lock part shown in FIG. 5 viewed from bottom in an arrow V11 direction in FIG. 5.

FIG. 7 is a perspective view showing the projection lock part and the accommodation lock part shown in FIG. 5 viewed from bottom in an arrow V11 direction in FIG. 5.

The projection lock part 13 and the accommodation lock part 14 are provided on the back side of the base part 11 of the holding mechanism 10 at one end 111 of the both ends 111 in the right-left direction D15 intersecting with the projecting and retracting direction D11. Further, the upper chassis 21 of the device main body 20 is provided with an engagement protrusion 213 to which the accommodation lock part 14 engages. Additionally, of the pair of slide supporting parts 212, the slide supporting part 212 on the side corresponding to the projection lock part 13 is provided with a rack 212b made of resin to which the projection lock part 13 engages and which has serrated teeth 212b-1 arranged in the projecting and retracting direction D11.

Firstly, the accommodation lock part 14 and the engagement protrusion 213 will be explained.

Figure 8:
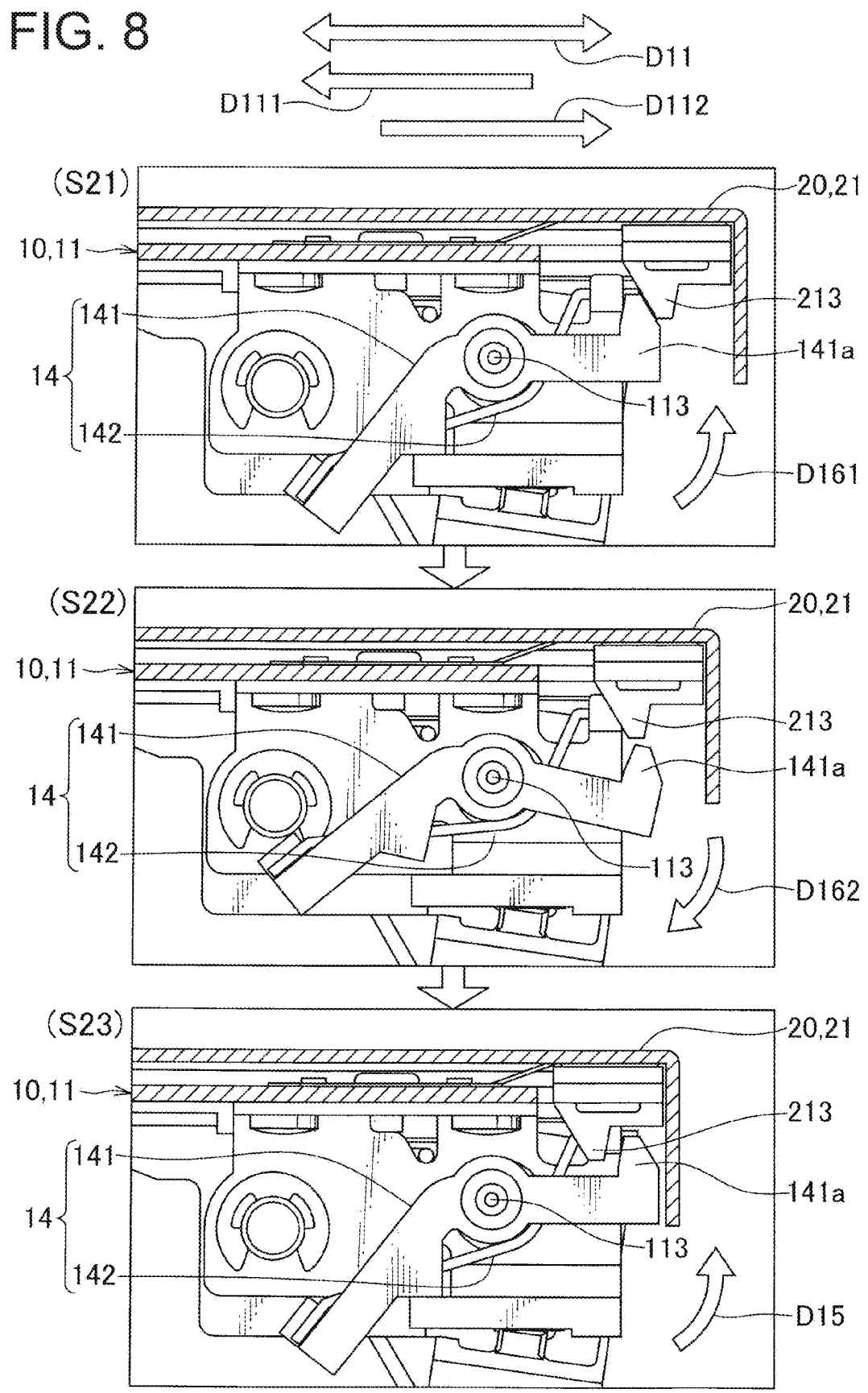
FIG. 8 is a schematic diagram showing how the accommodation lock part shown in FIG. 7 is engaged to an engagement protrusion provided to the upper chassis.

FIG. 8 is a schematic diagram showing how the accommodation lock part shown in FIG. 7 is engaged to the engagement protrusion provided to the upper chassis.

The accommodation lock part 14 includes a lock lever 141 and an accommodation lock torsion spring 142. The lock lever 141 is a bent rod-shaped member having an engagement hook 141a arranged at a tip end thereof on the back side of the holding device 1, and is pivotally supported, near the bent portion, on an accommodation lock rotation shaft 113 provided to the base part 11. The accommodation lock torsion spring 142 biases the lock lever 141 in an accommodation lock biasing direction D161 in which the engagement hook 141a is rotated around the accommodation lock rotation shaft 113 toward the upper chassis 21. The engagement hook 141a includes slope faces arranged respectively on a front side and a rear side in a retracting direction D112 in the projecting and retracting direction D11.

The engagement protrusion 213 provided to the upper chassis 21 includes slope faces which correspond to the above-described slope faces of the engagement hook 141a and which are arranged respectively on the front side and the rear side in the retracting direction D112.

When the holding mechanism 10 is pressed into the device main body 20 in the retracting direction D112, the slope face on the front side of the engagement hook 141a first abuts on the slope face on the rear side of the engagement protrusion 213, in step S21 of FIG. 8. In the next step S22, the holding mechanism 10 is further pressed in the retracting direction D112. As a result, the slope face on the front side of the engagement hook 141a is pushed upward so as to slide on the slope face on the rear side of the engagement protrusion 213, and the lock lever 141 rotates against the biasing force of the accommodation lock torsion spring 142 and rotates in a move-over rotating direction D162 that is opposite to the accommodation lock biasing direction D161. As a result, the engagement hook 141a moves over the engagement protrusion 213.

In the subsequent step S23, the holding mechanism 10 is further pressed in the retracting direction D112, and the engagement hook 141a moves over the engagement protrusion 213, and the lock lever 141 is rotated in the accommodation lock biasing direction D161 by the biasing force of the accommodation lock torsion spring 142. As a result, the engagement hook 141a is engaged to the engagement protrusion 213 and becomes in a locked state, reaching to the accommodated position.

When the holding mechanism 10 is drawn out from the device main body 20 in the projecting direction D111, as the holding mechanism 10 moves in the projecting direction D111, the engagement hook 141a rotates against the biasing force of the accommodation lock torsion spring 142 and rotates in the move-over rotating direction D162. Thus, the engagement hook 141a moves over the engagement protrusion 213, releasing the lock.

Next, a structure of the holding mechanism 10 including the base part 11 and the holding part 12 will be explained in more detail.

As explained with reference to FIG. 4, the holding mechanism 10 is drawn out from the device main body 20 in the single plate shape with the holding part 12 extending along a line extended from the base part 11. The holding mechanism 10 is also formed into such single plate shape when being accommodated into the device main body 20. Then, after the holding mechanism 10 is drawn out from the device main body 20, the holding part 12 is erected in the erecting direction D121, and the smartphone 5 is held by the holding part 12. To enable this movement, the holding part 12 is coupled via a hinge to one end of the base part 11.

Figure 9:
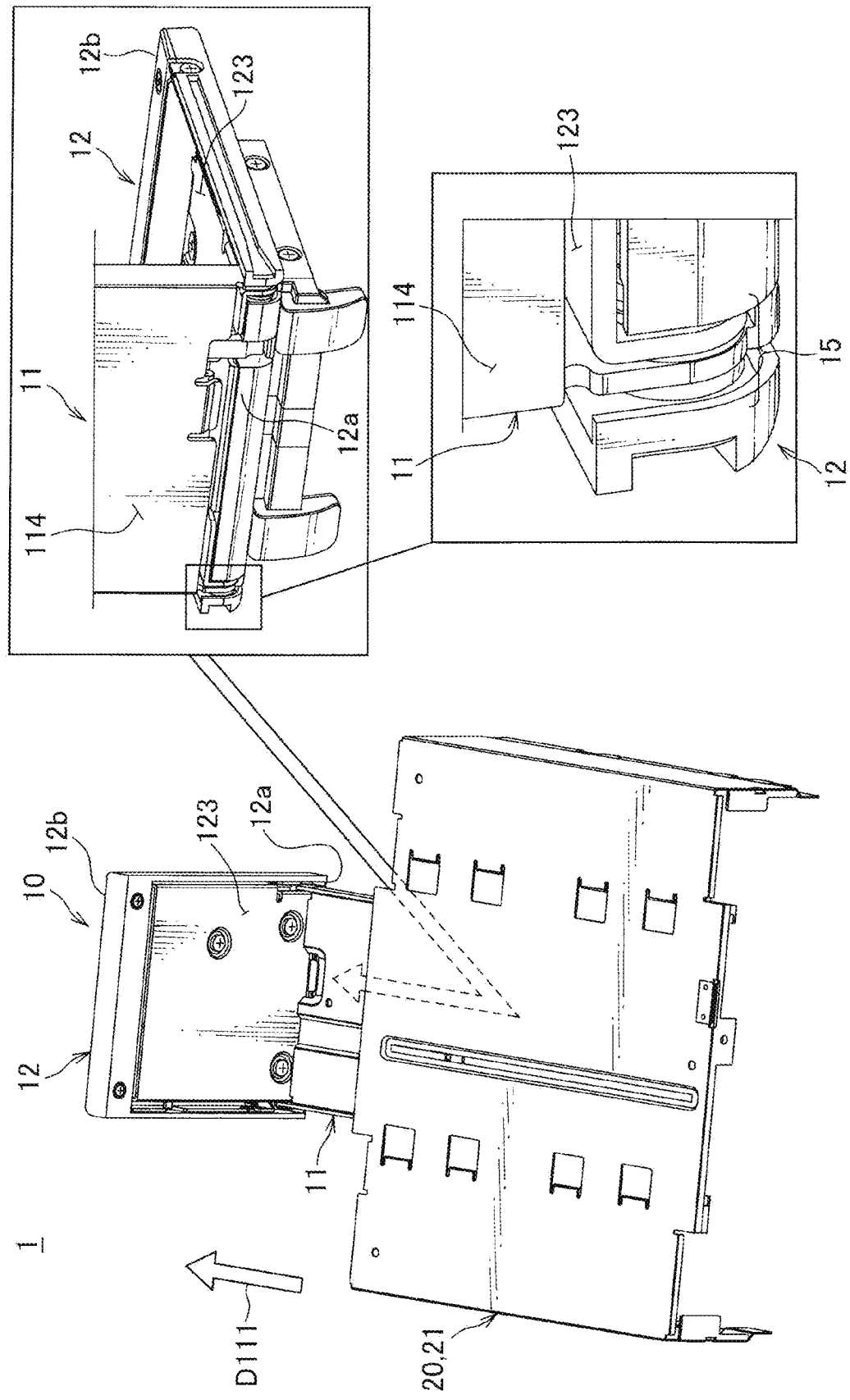
FIG. 9 is a diagram showing a structure for coupling a base part and a holding part of the holding mechanism.

FIG. 9 is a diagram showing a structure for coupling the base part and the holding part of the holding mechanism.

FIG. 9 illustrates a state in which the holding mechanism 10 is drawn out in the projecting direction D111 from the device main body 20 of the holding device 1 in which only the upper chassis 21 is shown, and the holding part 12 is erected. The drawing further shows an enlarged view of the structure for coupling the base part 11 and the holding part 12 in the above-described state viewed from a bottom face side of the base part 11, and an enlarged view of one of the pair of the coupling structures provided on right and left sides.

In this coupling structure, a base part side sheet metal frame 114 constituting the bottom face side of the base part 11, and a holding side sheet metal frame 123 constituting a back face side of the holding part 12 opposite to the side on which the smartphone 5 is held, are coupled via hinge. In each of the coupling structures on the right and left sides, a torque hinge 15 is provided so as to sandwich a part of the base part side sheet metal frame 114 and a part of the holding side sheet metal frame 123. With this torque hinge 15, the erected state of the holding part 12 as described above is maintained while withstanding the weight of the smartphone 5 when the smartphone 5 is held.

Next, the projection lock part 13 and the rack 212b shown in FIG. 7 will be explained.

In this embodiment, when the holding mechanism 10 is arranged such that the base part 11 and the holding part 12 are forming the single plate shape, the projection lock part 13 is in an unlocked state with respect to the rack 212b, and the holding mechanism 10 is free to slidably project and retract in the projecting and retracting direction D11. Then, when the holding part 12 is erected at an arbitrary projected position, the projection lock part 13 becomes in a locked state with respect to the rack 212b.

Figure 10:
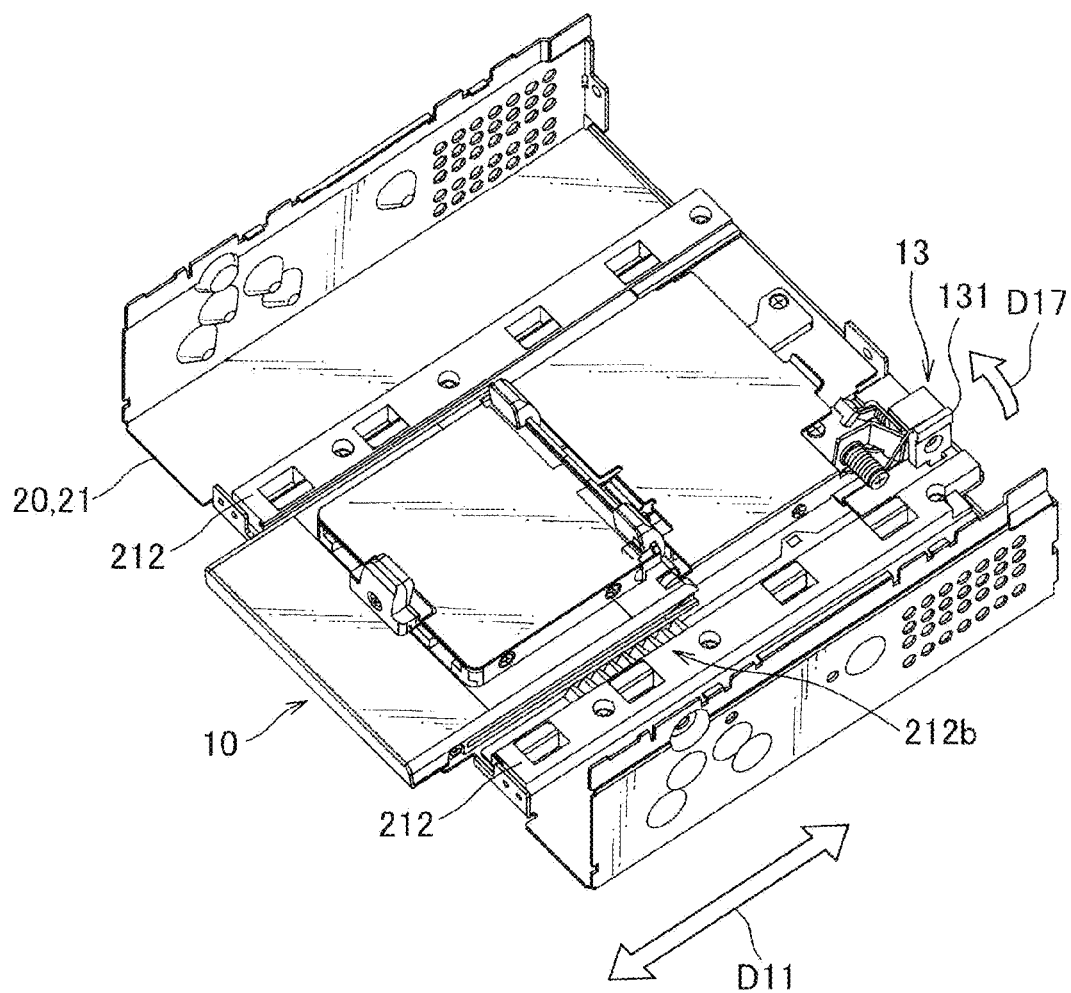
FIG. 10 is a diagram showing the holding mechanism at an accommodated position viewed from a direction capable of viewing a rack and the projection lock part.
Figure 11:
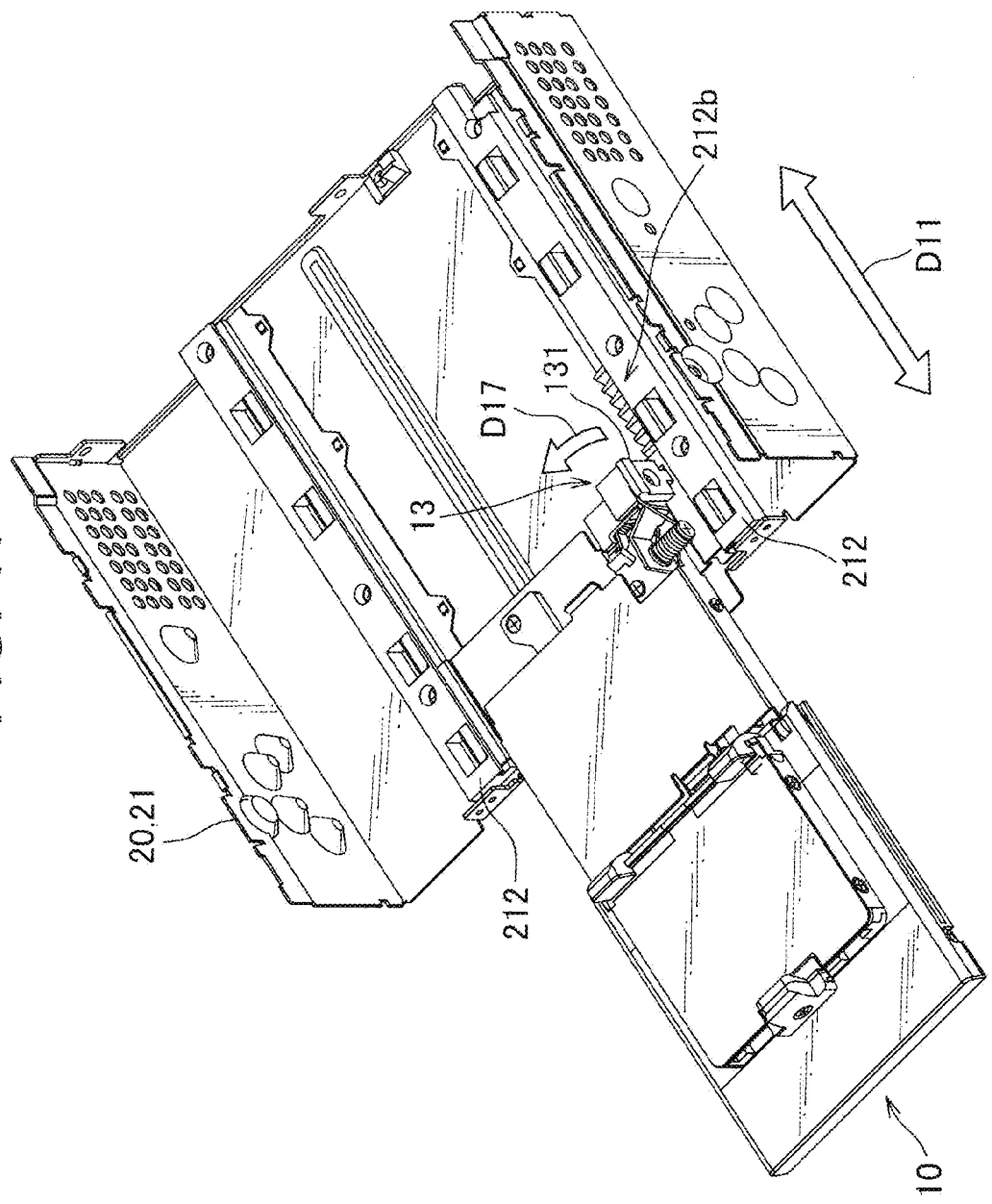
FIG. 11 is a diagram showing the holding mechanism shown in FIG. 10 in a state drawn out from the device main body in a single plate-shaped form to an arbitrary projected position.

FIG. 10 is a diagram showing the holding mechanism at the accommodated position viewed from a direction capable of viewing the rack and the projection lock part. In FIG. 10, the upper chassis 21 of the device main body 20 and the holding mechanism 10 are shown as vertically turned over view of FIG. 7. Further, FIG. 11 is a diagram showing the holding mechanism shown in FIG. 10 in a state drawn out from the device main body in the single plate-shaped form to an arbitrary projected position. Further, FIG. 12 is a diagram showing the holding mechanism at the arbitrary projected position as shown in FIG. 11 with the holding part erected.

In the states shown in FIG. 10 and FIG. 11, in the single plate-shaped holding mechanism 10, an engagement part 131 provided to the projection lock part 13 is in a state rotated in a disengaging direction D17 away from the upper chassis 21 and lifted, as will be described in more detail below. Thus, the holding mechanism 10 is free to slidably project and retract in the projecting and retracting direction D11 without the rack 212b provided to the slide supporting part 212 interfering with the engagement part 131.

Figure 12:
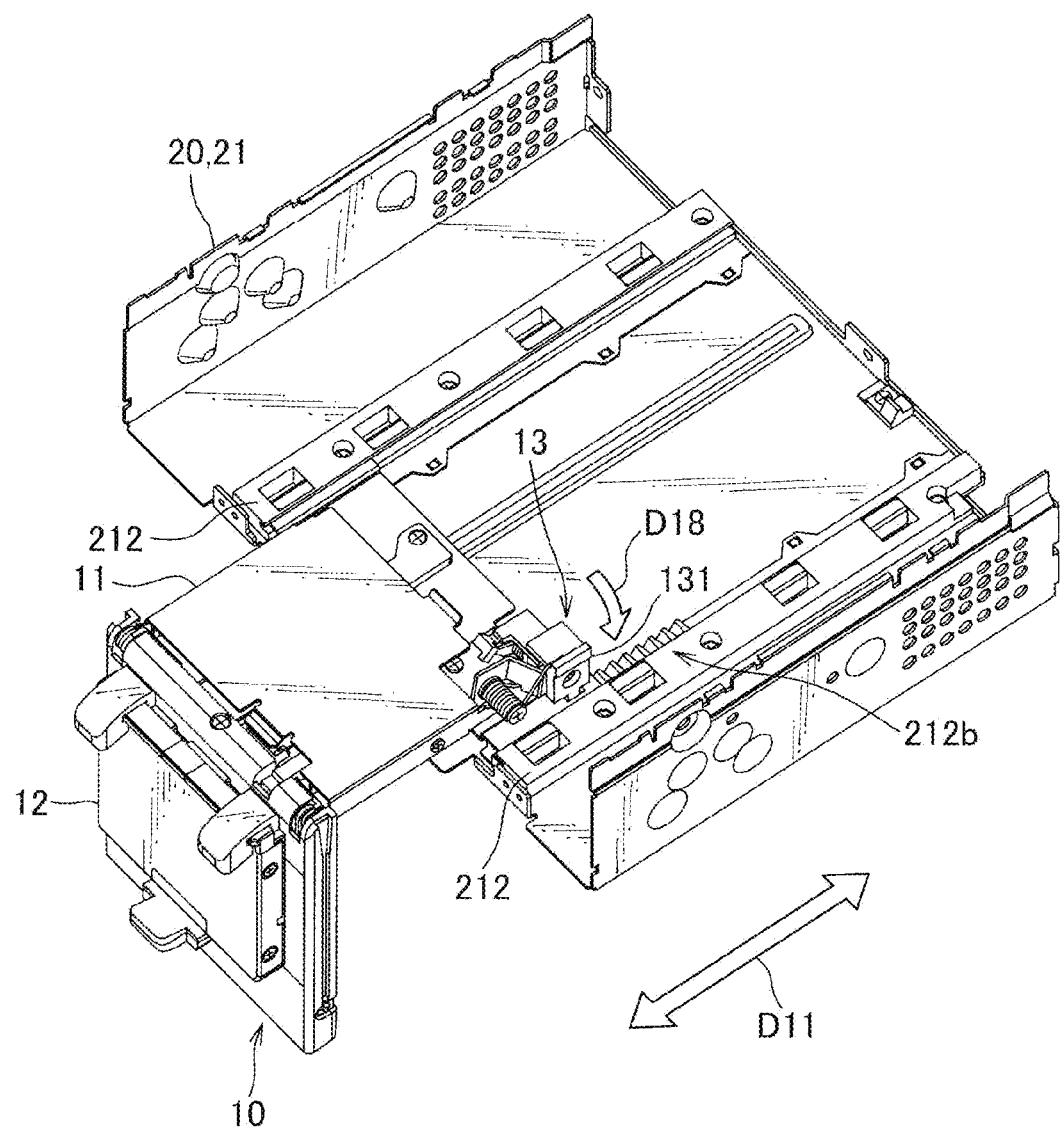
FIG. 12 is a diagram showing the holding mechanism at the arbitrary projected position as shown in FIG. 11 with the holding part erected.

On the other hand, in the state shown in FIG. 12, the holding part 12 is erected with respect to the base part 11 in the holding mechanism 10 in an arbitrary projected position, while the engagement part 131 is in a state rotated in the engaging direction D18 toward the upper chassis 21 and descended. Thus, the engagement part 131 is engaged to the rack 212b, and the holding mechanism 10 is locked at that projected position. The engagement part 131 is engaged to the serrated tooth 212b-1 at an arbitrary location in the linearly-arranged serrated teeth 212b-1 of the rack 212b. In this manner, the rack 212b serves as a to-be-engaged body including a plurality of serrated teeth 212b-1 as to-be-engaged parts arranged in the projecting and retracting direction D11.

In this embodiment, the rotation of the engagement part 131 for the locking by the projection lock part 13 is performed upon application of rotating operation in which a user rotates the holding part 12 so as to erect it with respect to the base part 11.

Figure 13:
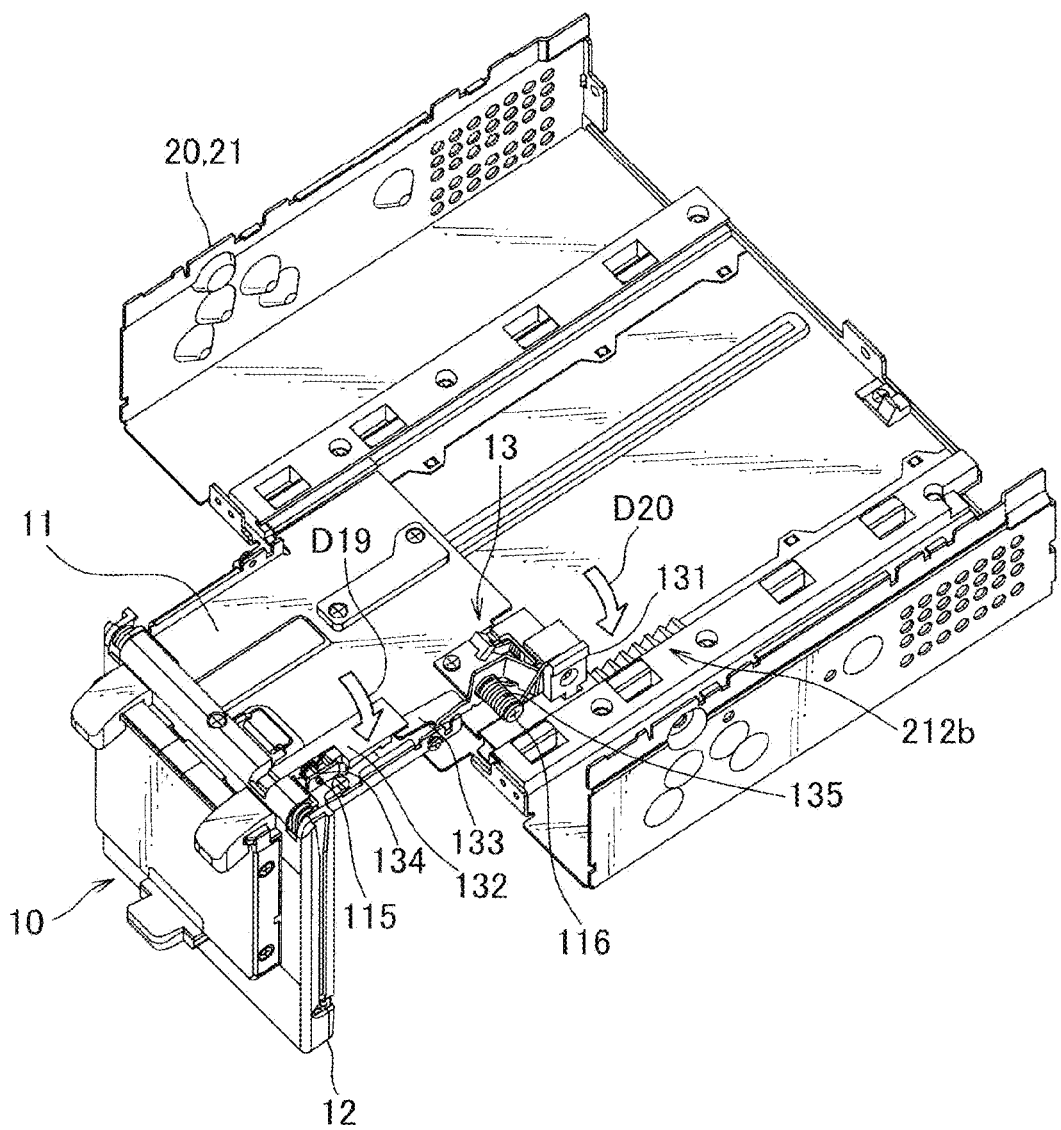
FIG. 13 is a diagram of the holding mechanism shown in FIG. 12, in which a base part side sheet metal frame constituting a bottom face side of the base part is omitted to show the projection lock part such that an entirety including a structure for rotating an engagement part can be viewed.
Figure 14:
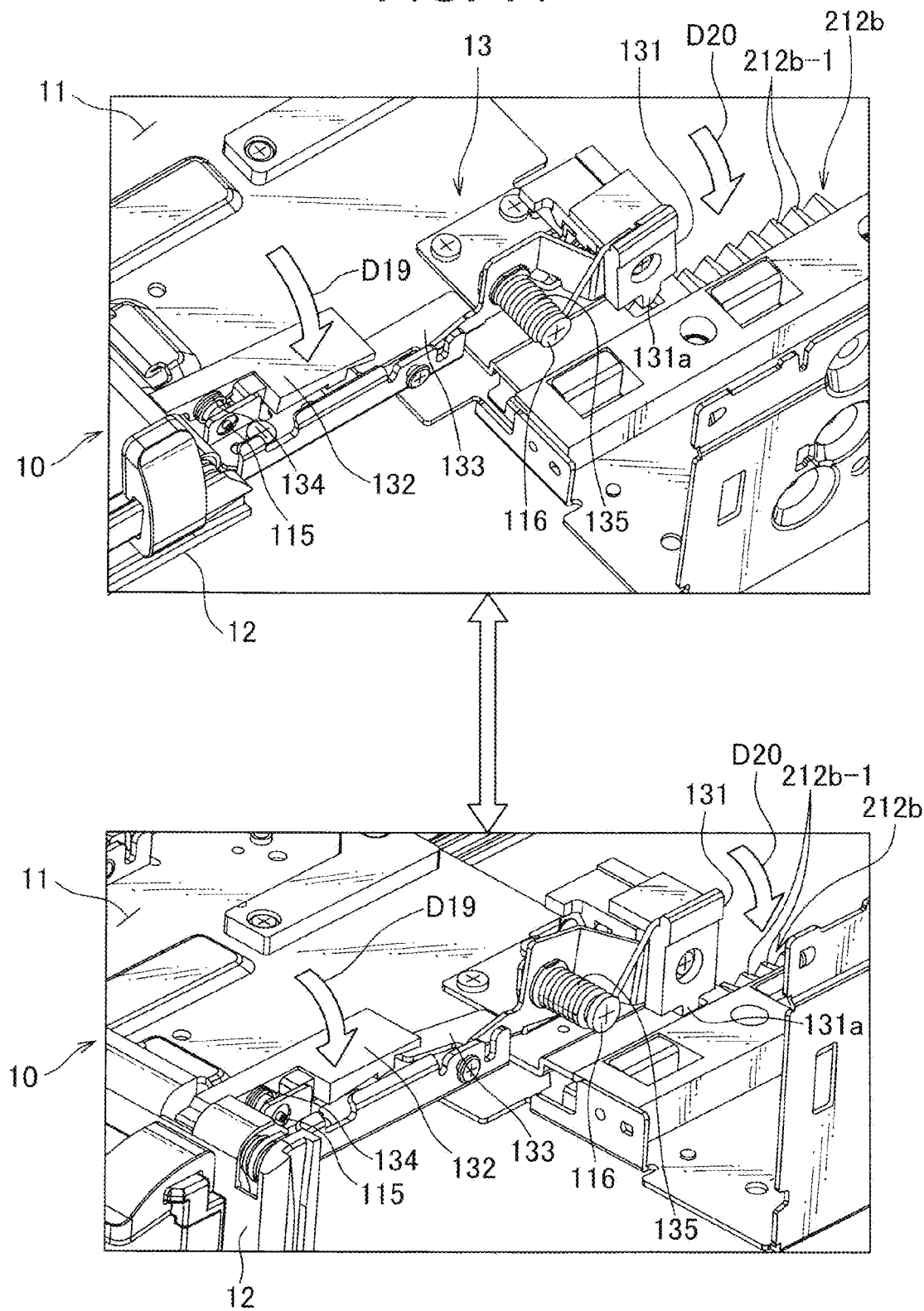
FIG. 14 shows an enlarged view of the projection lock part shown in FIG. 13, one showing a state in which the engagement part is in a disengaged position with respect to the rack, and the other showing a state in which the engagement part is in an engaged position with respect to the rack.

FIG. 13 is a diagram of the holding mechanism shown in FIG. 12 in which the base part side sheet metal frame constituting the bottom face side of the base part is omitted to show the projection lock part such that an entirety including a structure for rotating the engagement part can be viewed. FIG. 14 shows an enlarged view of the projection lock part shown in FIG. 13, one showing a state in which the engagement part is in a disengaged position with respect to the rack, and the other showing a state in which the engagement part is in an engaged position with respect to the rack. In FIG. 14, the upper diagram shows the state in which the engagement part is in the disengaged position, and the lower diagram shows the state in which the engagement part is in the engaged position.

In this embodiment, the projection lock part 13 includes the engagement part 131, a first rotary body 132, a second rotary body 133, a backlash suppressing torsion spring 134 and a projection locking torsion spring 135.

The first rotary body 132 is pivotally supported on a projection locking first rotation shaft 115 provided to the base part 11 of the holding mechanism 10. The backlash suppressing torsion spring 134 is configured to suppress the backlash of the first rotary body 132 by biasing the first rotary body 132 in a backlash suppressing biasing direction D19 around the projection locking first rotation shaft 115, the backlash suppressing biasing direction D19 being a direction in which an end on the second rotary body 133 side is pressed against the second rotary body 133. The second rotary body 133 is pivotally supported on the projection locking second rotation shaft 116 provided to the base part 11 of the holding mechanism 10. The projection locking torsion spring 135 biases the second rotary body 133 and the engagement part 131 in the projection locking biasing direction D20 around the projection locking second rotation shaft 116, the projection locking biasing direction D20 being a direction in which the engagement part 131 is directed toward the engaged position. The projection locking biasing direction D20 is the same direction as the engaging direction D18 shown in FIG. 12. The first rotary body 132 and the second rotary body 133 are arranged such that there ends contact each other.

The engagement part 131 is a rectangular plate made of resin, and is provided with a protrusion 131a at an edge thereof in the projection locking biasing direction D20. Such engagement part 131 is fixed to an end of the second rotary body 133 on the opposite side of the first rotary body 132. During the engagement to the rack 212b, this engagement part 131 moves to the engaged position shown in the lower side of FIG. 14, by the rotation of the second rotary body 133 applied with the biasing force of the projection locking torsion spring 135. Then, in this engaged position, the protrusion 131a of the engagement part 131 is engaged to the serrated tooth 212b-1 of the rack 212b. Inversely, during disengagement from the rack 212b, the engagement part 131 moves to the disengaged position shown in the upper side of FIG. 14, by the inverse rotation of the second rotary body 133 against the biasing force of the projection locking torsion spring 135. In the disengaged position, the protrusion 131a of the engagement part 131 is separated from the serrated teeth 212b-1 of the rack 212b.

In this embodiment, the holding mechanism 10 is configured such that the engagement part 131 is moved by the rotation of the first rotary body 132 and the second rotary body 133 accompanied by the rotating operation in which the user rotates the holding part 12 with respect to the base part 11.

Figure 15:
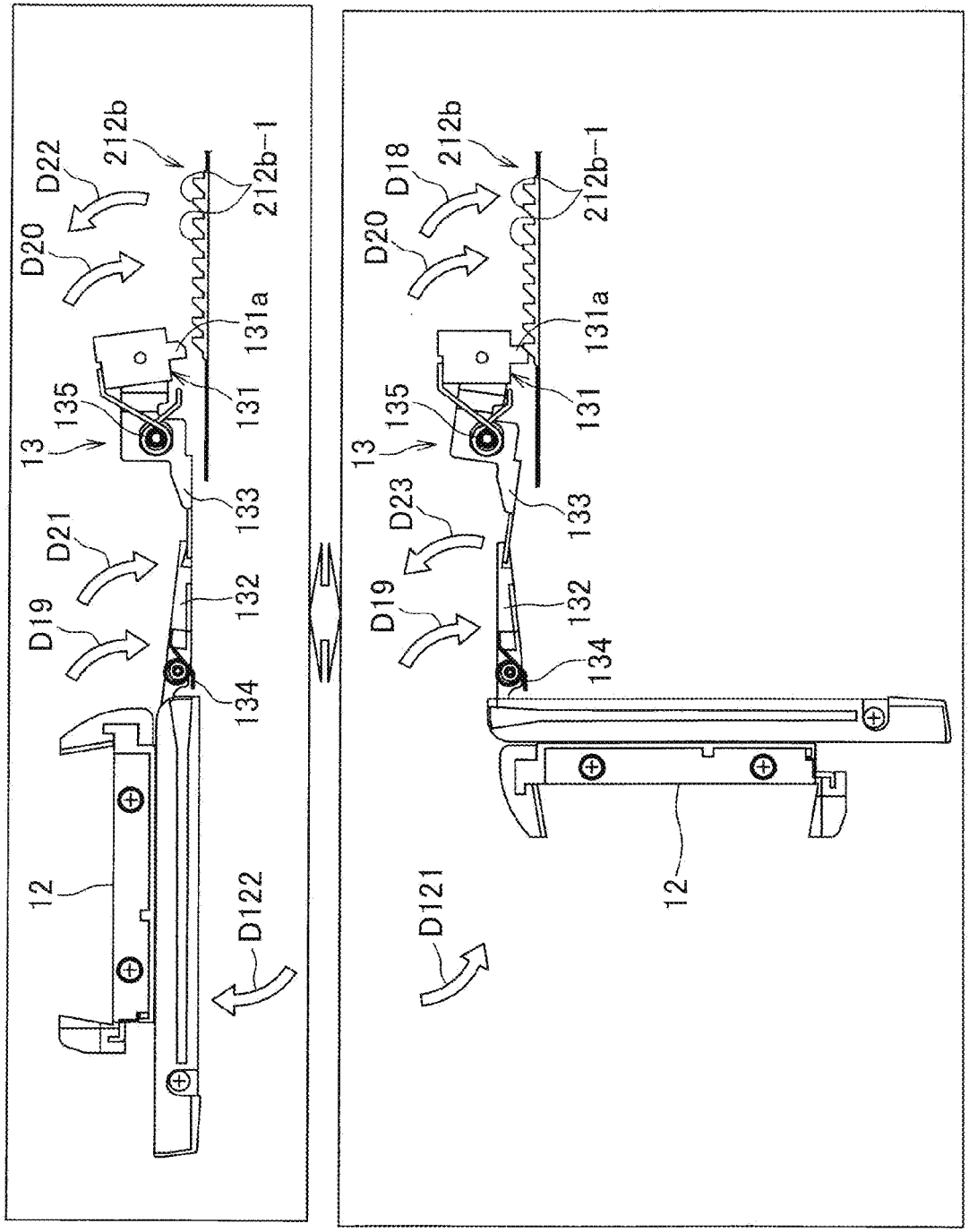
FIG. 15 schematically shows how the engagement part is moved by rotation of a first rotary body and a second rotary body caused by rotating operation with respect to the holding part.

FIG. 15 schematically shows how the engagement part is moved by the rotation of the first rotary body and the second rotary body accompanied by the rotating operation with respect to the holding part. In FIG. 15, for sake of simplicity, only the holding part 12, the projection lock part 13 and the rack 212b are shown. In FIG. 15, the upper diagram shows a state in which the engagement part 131 is at the disengaged position, and the lower diagram shows a state in which the engagement part 131 is at the engaged position.

When the holding part 12 is rotated in the erecting direction D121 also shown in FIG. 2, this rotating operation causes the first rotary body 132 to rotate in an arrow D23 direction. The rotation of this first rotary body 132 is a movement in which the end thereof is pressed in the arrow D23 direction by the rotation of the second rotary body 133 due to the biasing force in the projection locking biasing direction D20 by the projection locking torsion spring 135 applied via the engagement part 131. By this biasing force, the second rotary body 133 rotates in the engaging direction D18 to the engaged position with respect to the rack 212b. In this engaged position, the protrusion 131a of the engagement part 131 engages to the serrated tooth 212b-1 of the rack 212b, as described above. In this manner, the holding mechanism 10 is locked. In this embodiment, the projection locking torsion spring 135 is a biasing means that biases the engagement part 131 for locking. During such movement, the end of the first rotary body 132 is pressed against the second rotary body 133 by the biasing force and pressed in the backlash suppressing biasing direction D19 by the backlash suppressing torsion spring 134, thereby suppressing the backlash.

On the other hand, when the holding part 12 is rotated in a lying direction D122 opposite to the erecting direction D121, this rotating operation makes the first rotary body 132 to rotate in the arrow D21 direction against the pressing by the second rotary body 133 applied with the biasing force of the projection locking torsion spring 135. This rotation of the first rotary body 132 is a movement in which an end of the second rotary body 133 on the first rotary body 132 side is pressed down against the biasing force in the projection locking biasing direction D20. As a result, the second rotary body 133 is rotated in the disengaging direction D22 to the disengaged position with respect to the rack 212b against the biasing force in the projection locking biasing direction D20. In this disengaged position, the protrusion 131a of the engagement part 131 is separated from the serrated teeth 212b-1 of the rack 212b, as described above. In such manner, the holding mechanism 10 is unlocked. In this embodiment, the first rotary body 132 and the second rotary body 133 correspond to unlocking means for unlocking. During this state also, the end of the first rotary body 132 is continuously pressed against the second rotary body 133 by the biasing force in the backlash suppressing biasing direction D19, thereby suppressing the backlash.

In this embodiment, the following structure has been employed to rotate the first rotary body 132 by the rotating operation of the holding part 12.

Figure 16:
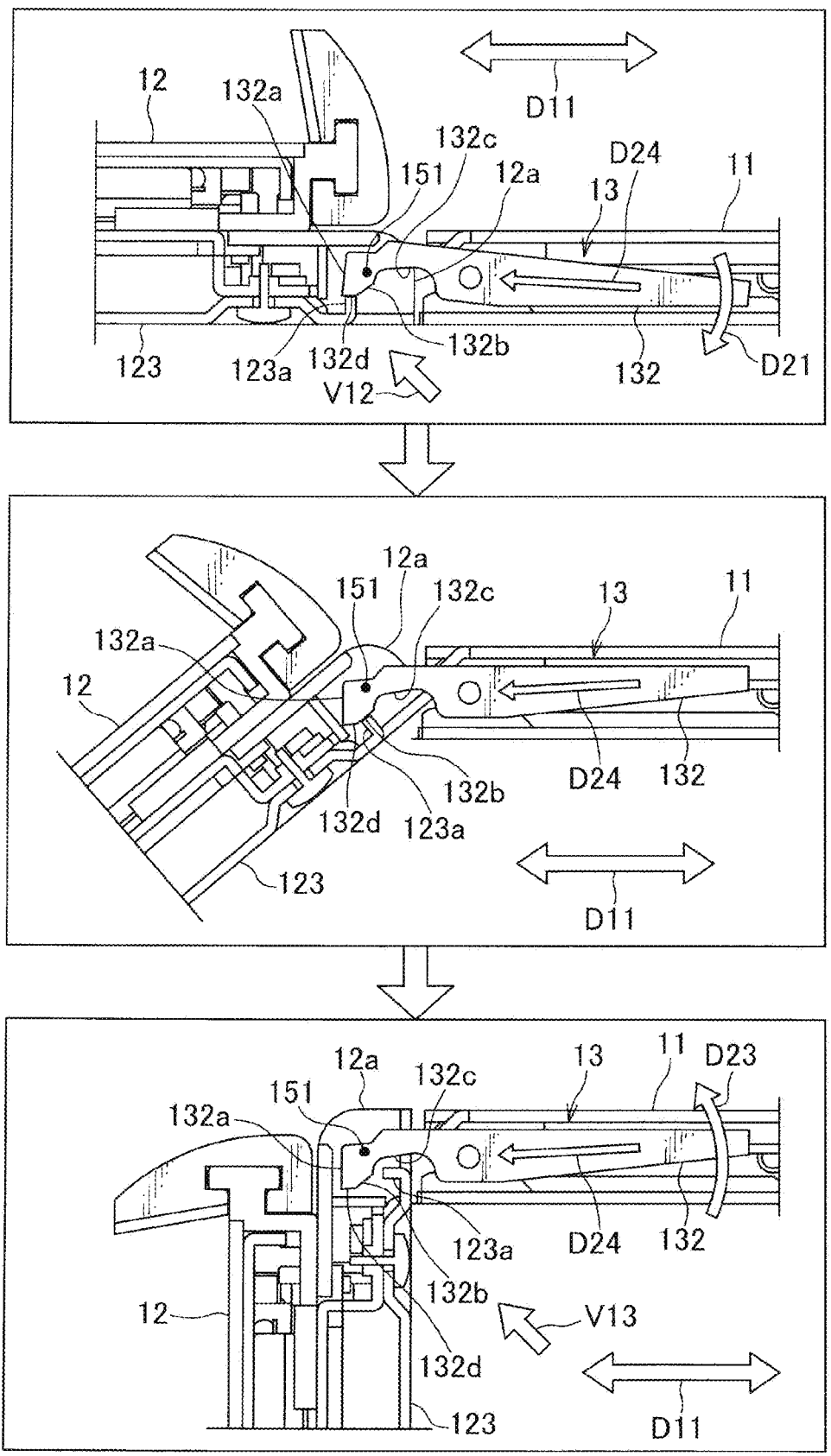
FIG. 16 shows a cross sectional view of the holding mechanism showing a structure for rotating the first rotary body by the rotating operation of the holding part.

FIG. 16 shows a cross sectional view of the holding mechanism showing the structure for rotating the first rotary body by the rotating operation of the holding part. In FIG. 16, the upper most diagram shows a state in which the holding part 12 is rotated in the lying direction D122 shown in FIG. 15 to achieve the unlocking, the lower most diagram shows a state in which the holding part 12 is rotated in the erecting direction D121 to achieve the locking. Further, the middle diagram in the drawing shows a transitional state between the locked state and the unlocked state in which the holding part 12 is in the middle of rotating.

Figure 17:
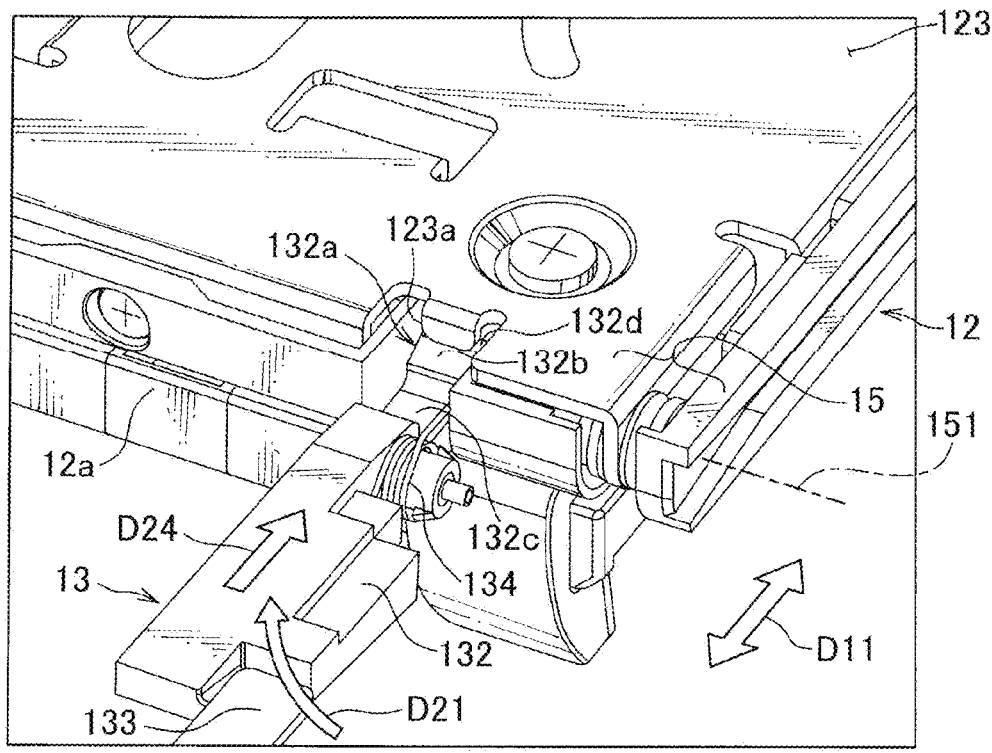
FIG. 17 is a perspective view of a boundary part between the holding part and the projection lock part in an unlocked state shown in FIG. 16, viewed in an arrow V12 direction in FIG. 16.
Figure 18:
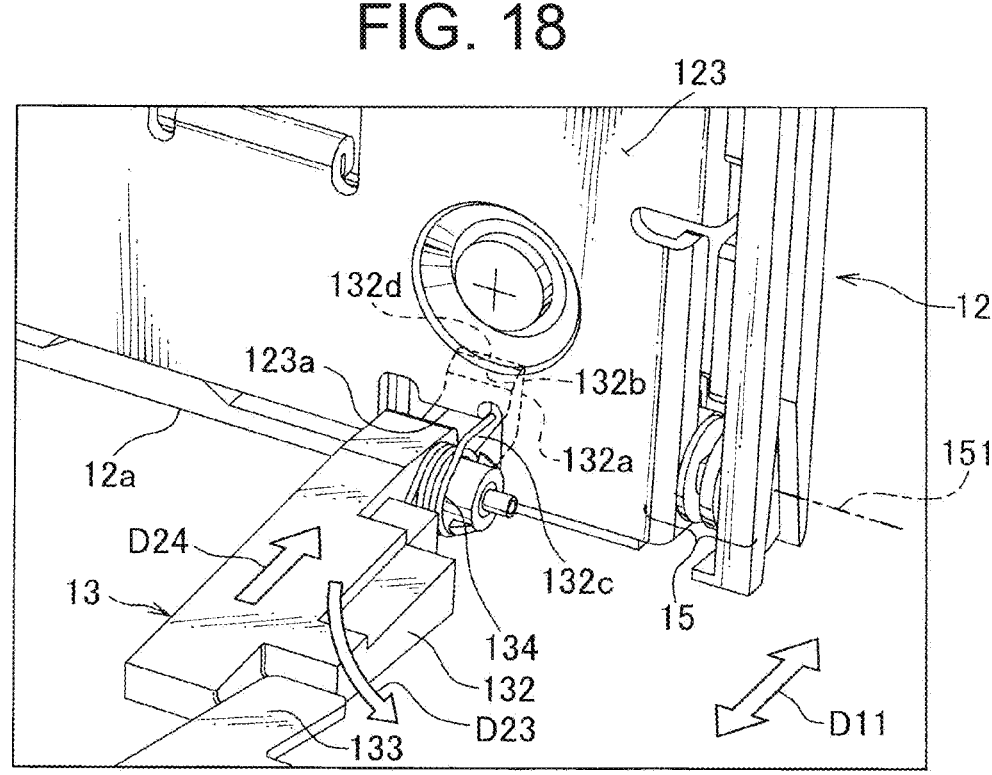
FIG. 18 is a perspective view of a boundary part between the holding part and the projection lock part in a locked state shown in FIG. 16, viewed in an arrow V13 direction in FIG. 16.

Further, FIG. 17 is a perspective view of a boundary part between the holding part and the projection lock part in the unlocked state shown in FIG. 16, viewed in an arrow V12 direction in FIG. 16. FIG. 18 is a perspective view of a boundary part between the holding part and the projection lock part in the locked state shown in FIG. 16, viewed in an arrow V13 direction in FIG. 16.

In this embodiment, the first rotary body 132 of the projection lock part 13 serves as an operation arm provided to the base part 11 and configured to perform the switching between the locked state and the unlocked state of the base part. The holding part 12 is provided with a switching part 123a configured to allow the first rotary body 132 to perform the above-described switching by rotating the first rotary body 132 as the operation arm in association with the rotation of the holding part 12. This switching part 123a is constituted by extending a part of the holding side sheet metal frame 123 also shown in FIG. 9, which is the chassis constituting the holding part 12. The switching part 123a is formed by bending this part of the holding side sheet metal frame 123 so as to project toward inside the holding part 12. Then, a tip end of that bent shape moves the first rotary body 132.

One end 12a of the holding part 12 is pivotally supported on the base part 11 via a rotation shaft 151 passing through a center of the torque hinge 15. A tip end 132a of the first rotary body 132 extends beyond this rotation shaft 151 to the holding part 12 side. The switching part 123a is provided at a location on the holding part 12 closer to another end 12b (refer to FIG. 9) on the opposite side of the one end 12a than the rotation shaft 151. This switching part 123a moves the tip end 132a of the first rotary body 132 in association with the rotation of the holding part 12.

Further, the tip end 132a of the first rotary body 132 is provided with an inclined face 132b intersecting an extending direction D24 of the first rotary body 132 and facing the retracting side in the projecting and retracting direction D11 of the base part 11. A recessed part 132c is provided on the first rotary body 132 on the further retracting side with respect to the inclined face 132b. In addition, the tip end 132a of the first rotary body 132 is provided with an intersection face 132d extending from the inclined face 132b to the projecting side in the projecting and retracting direction D11 so as to intersect the inclined face 132b.

As shown in the upper most diagram in FIG. 16 and in FIG. 17, in the state in which the holding part 12 lies down to form the single plate shape with the base part 11, the switching part 123a presses the intersection face 132d with its tip end of its bent shape. In this state, the first rotary body 132 is rotated in the arrow D21 direction due to the pressing by the switching part 123a, and the second rotary body 133 and the engagement part 131 are rotated in the disengaging direction D22 to the disengaged position with respect to the rack 212b, against the biasing force of the projection locking torsion spring 135. That is, in this state, the base part 11 is set to the unlocked state.

When the holding part 12 is rotated in the erecting direction D121 around the rotation shaft 151, the pressed location by the switching part 123a is moved from the intersection face 132d to the inclined face 132b, as shown in the middle diagram in FIG. 16. Then, when the holding part 12 is further rotated in the erecting direction D121, the switching part 123a separates from the inclined face 132b in the retracting side in the projecting and retracting direction D111 and releases the pressing with respect to the inclined face 132b, and the tip end thereof is accommodated in the recessed part 132c, as shown in the lower most diagram in FIG. 16 or in FIG. 18. Further, at this time, the tip end of the bent shape of the switching part 123a is facing the projecting side in the projecting and retracting direction D11. With the pressing being released, the end of the first rotary body 132 is pressed by the second rotary body 133 due to the biasing force of the projection locking torsion spring 135, and the first rotary body 132 is rotated in the arrow D23 direction. As described above with reference to FIG. 15, the rotation of the first rotary body 132 in the arrow D23 direction allows the second rotary body 133 and the engagement part 131 to rotate in the engaging direction D18 to the engaged position with respect to the rack 212b. That is, in this state, the base part 11 is set to the locked state.

When the holding part 12 is rotated inversely from the erected state, the tip end of the switching part 123a comes out from the recessed part 132c and presses the inclined face 132b, as shown in the middle drawing of FIG. 16. Further, as the holding part 12 is being rotated, the location of pressing by the switching part 123a moves from the inclined face 132b to the intersection face 132d. Due to this pressing by the switching part 123a, the first rotary body 132 is rotated in the arrow D21 direction, and the base part 11 transits to the unlocked state.

According to the structure described above, the first rotary body 132 is rotated in association with the rotating operation of the holding part 12, and accompanied with this rotation the second rotary body 133 and the engagement part 131 are rotated, thereby performing the switching from the unlocked state to the locked state or from the locked state to the unlocked state.

Figure 19:
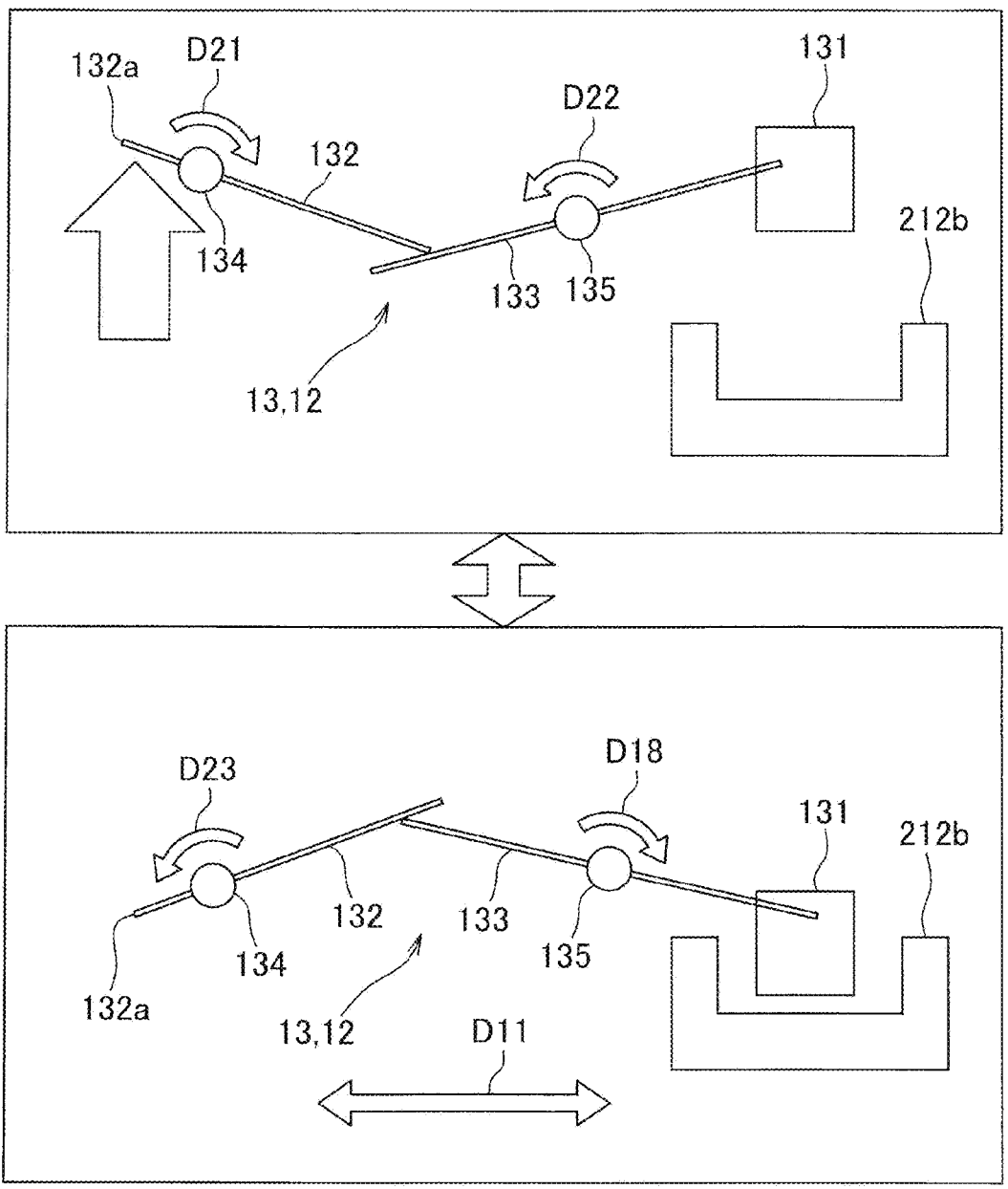
FIG. 19 is a schematic, simplified diagram illustrating a switching operation for switching between the locked state and the unlocked state explained with reference to FIG. 14 to FIG. 18.

FIG. 19 is a schematic, simplified diagram illustrating the switching operation for switching between the locked state and the unlocked state explained with reference to FIG. 14 to FIG. 18. In FIG. 19, the upper side shows the unlocked state, and the lower side shows the locked state.

Firstly, in the unlocked state of the projection lock part 13, the switching part 123a (refer to FIG. 16, FIG. 17 and FIG. 18) of the holding part 12 lied down in the lying direction D122 (refer to FIG. 15) presses the tip end 132a of the first rotary body 132. Due to this pressing, the first rotary body 132 is being rotated in the arrow D21 direction against the pressing by the second rotary body 133 applied with the biasing force of the projection locking torsion spring 135. As a result, the second rotary body 133 and the engagement part 131 are arranged in the state of being rotated in the disengaging direction D22 to the disengaged position separated from the rack 212b, against the biasing force of the projection locking torsion spring 135. During this state, the end of the first rotary body 132 is continuously pressed against the second rotary body 133 by the biasing force of the backlash suppressing torsion spring 134, thereby suppressing the backlash.

On the other hand, in the locked state of the projection lock part 13, the switching part 123a of the holding part 12 erected in the erecting direction D1.21 (refer to FIG. 15) is separated from the tip end 132a of the first rotary body 132. Due to this separation, the second rotary body 133 and the engagement part 131 are being rotated in the engaging direction D18 by the biasing force of the projection locking torsion spring 135, to the engaged position engaged to the rack 212b. During this state also, the end of the first rotary body 132 is continuously pressed against the second rotary body 133 by the biasing force of the backlash suppressing torsion spring 134, thereby suppressing the backlash.

In this embodiment, in the locked state (engaged state) in which the engagement part 131 is engaged to the rack 212b, the holding mechanism 10 is capable of being moved in the projecting and retracting direction D11 together with the projection lock part 13. At this time, the holding mechanism 10 moves while being applied with the resistance force due to the interference between the engagement part 131 and the rack 212b.

Figure 20:
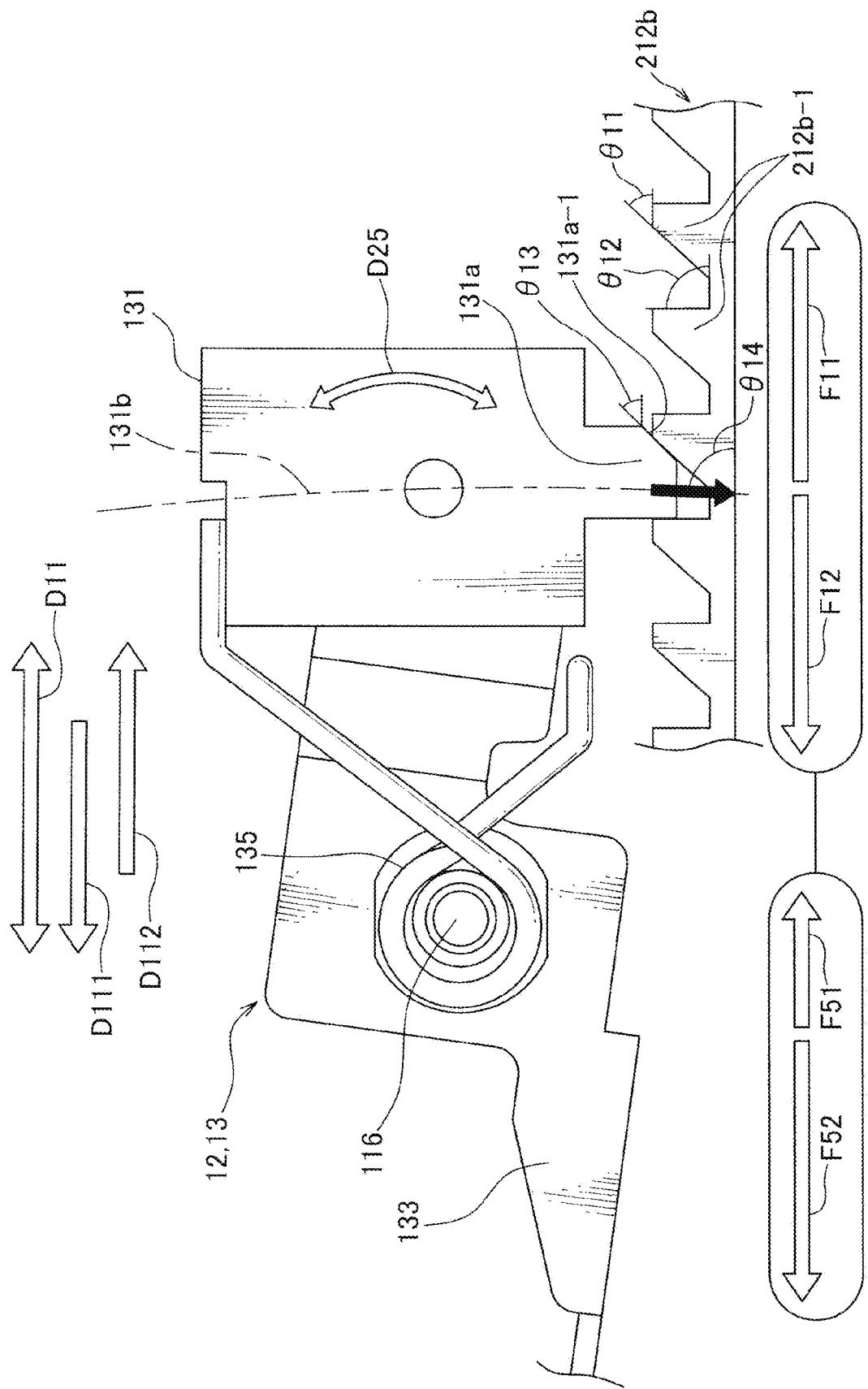
FIG. 20 is a schematic diagram showing how the holding mechanism moves while being applied with a resistance force due to an interference between the engagement part in the locked state and the rack.

FIG. 20 is a schematic diagram showing how the holding mechanism moves while being applied with the resistance force due to the interference between the engagement part in the locked state and the rack.

Firstly, in the projecting direction D111 in the projecting and retracting direction D11, the holding mechanism 10 moves while being applied with a first resistance force F11 in a direction opposite to the projecting direction D111. Further, in the retracting direction D112, the holding mechanism 10 moves while being applied with a second resistance force F12 in a direction opposite to the retracting direction D112. In these movements in either directions, the engagement part 131 is configured such that, the protrusion 131a is rotated against the biasing force of the projection locking torsion spring 135 while sliding on the serrated tooth 212b-1 of the rack 212b, and moves over the serrated tooth 212b-1. The first resistance force F11 and the second resistance force F12 applied on the holding mechanism 10 are associated with such moving over of the engagement part 131.

According to such structure, after the holding mechanism 10 is drawn out to the projected position and has been in the locked state, even when an unintended shock is applied to the holding mechanism 10 such as when hit by the user's hand, such shock can be absorbed and reduced by the movement of the holding mechanism 10.

At this time, in this embodiment, the first resistance force F11 and the second resistance force F12 are set to be substantially the same with each other. Since the first resistance force F11 and the second resistance force F12 that are opposite to each other in the projecting and retracting direction D11 are set to be substantially the same, they can absorb and reduce the shock in a similar manner regardless of the application direction of the shock.

The magnitude relationship between the first resistance force and the second resistance force is not limited to be substantially the same as in this embodiment, it may be different from each other. FIG. 20 also shows another embodiment in which the first resistance force and the second resistance force are set to be different in magnitude from each other. In this another embodiment, the second resistance force F52 is set to be larger than the first resistance force F51. This can provide a configuration considering the operability of the smartphone 5, such as a configuration in which the holding mechanism hardly retracts from the locked position by a force applied when the user touches the display screen and operates the smartphone 5, for example. Moreover, the above-mentioned configuration can enable fine-adjustment of the locked position in the projecting direction even after the holding part 12 has been erected, thereby improving convenience of the user.

In this embodiment, the first resistance force F11 and the second resistance force F12 are set based on a setting condition including an inclination angle θ11 on the projecting side in the projecting and retracting direction D11 and an inclination angle θ12 on the retracting side, of the serrated tooth 212b-1 of the rack 212b. Further, an inclined face 131a-1 is formed at a tip end of the protrusion 131a of the engagement part 131 on the retracting side in the projecting and retracting direction D11. An inclination angle θ13 of this inclined face 131a-1 is used as the setting condition of the second resistance force F12.

Further, the engagement part 131 moves with respect to the rack 212b along a rotating route 131b centered around the projection locking second rotation shaft 116. Then, it moves at a predetermined approach angle θ14 and engages with the rack 212b. In this embodiment, the approach angle θ14 of the engagement part 131 with respect to the rack 212b is also used as the setting condition for setting the first resistance force F11 and the second resistance force F12. In addition, the biasing force of the projection locking torsion spring 135 and such is also used as the setting condition of the first resistance force F11 and the second resistance force F12.

According to the holding device 1 of this embodiment described above, in the projection lock part 13, the mechanism for transmitting the rotating operation with respect to the holding part 12 to the engagement part 131 is constituted of the plurality of rotating element such as the first rotary body 132 and the second rotary body 133. Consequently, for each of the rotating elements, its length can be reduced and the moving distance of its rotating end can be reduced.

In this embodiment, the projection lock part 13 is mounted to the holding mechanism 10 such that the rotating direction of the first rotary body 132 and the second rotary body 133 correspond to the thickness direction of the holding mechanism 10. Consequently, the holding mechanism 10 is formed to have a thickness sufficient to accommodate this moving distance of the rotating end.

Figure 21:
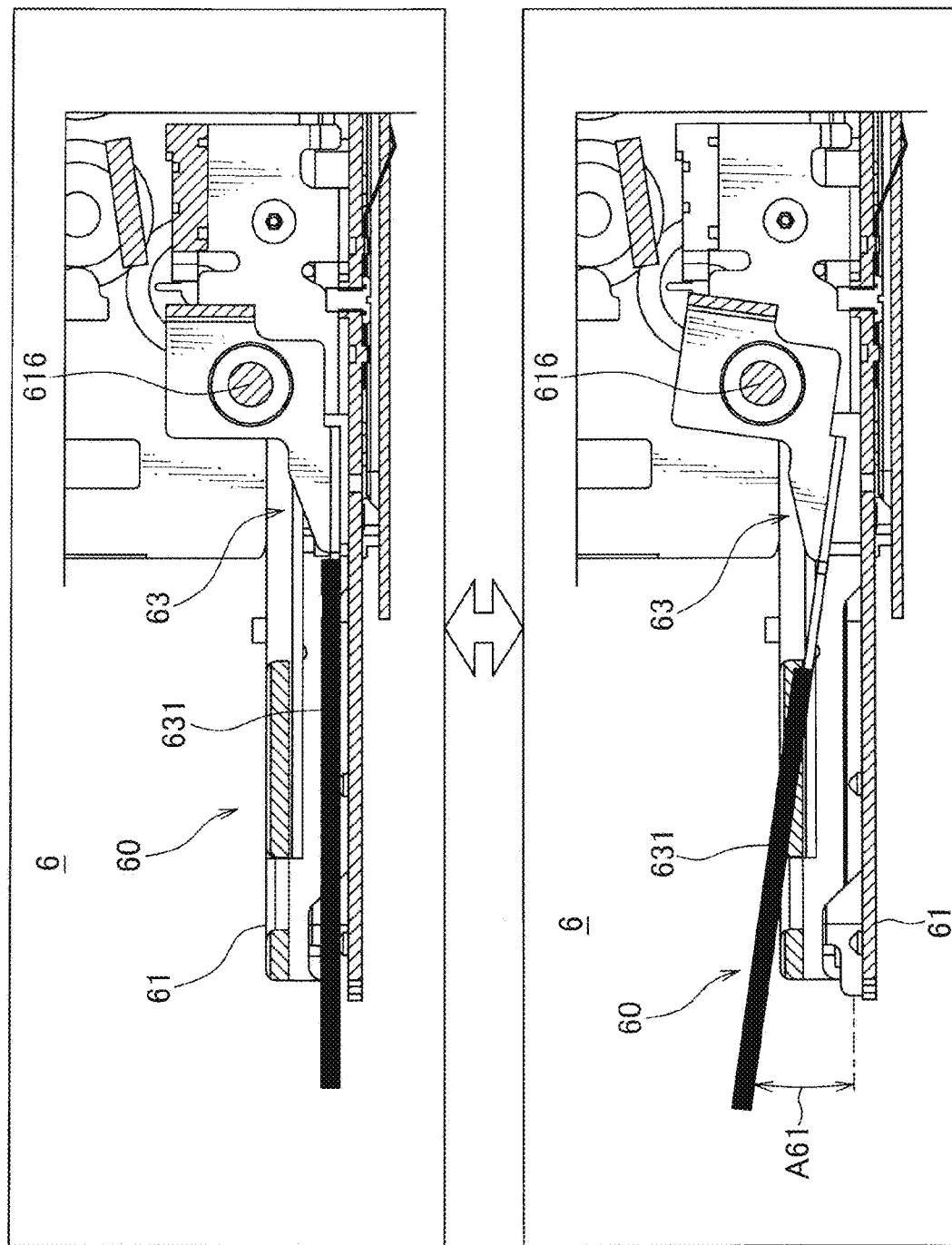
FIG. 21 shows a comparative example for comparison with the holding device shown in FIG. 1 to FIG. 20.

FIG. 21 shows a comparative example for comparison with the holding device shown in FIG. 1 to FIG. 20. In FIG. 21, the upper side shows a projection lock part 63 in the unlocked state of the holding mechanism 60 of the holding device 6 of the comparative example, and the lower side shows the projection lock part 63 in the locked state. In this projection lock part 63 of this comparative example, a single rotary body 631 is pivotally supported on a projection locking rotation shaft 616 provided to a base part 61. Thus, a moving distance A61 of a rotating end of the rotary body 631 extending long from the projection locking rotation shaft 616 is increased, thus the base part 61 (i.e., the holding mechanism 60) requires a thickness sufficient to accommodate this long moving distance A61 of the rotating end.

In contrast to this comparative example, the holding device 1 according to this embodiment can reduce the moving distance of the rotating end of the first rotary body 132 and the second rotary body 133 as the rotating element as described above. Consequently, the thickness of especially the base part 11 of the holding mechanism 10 can be reduced, thereby the holding device 1 can be downsized to reduce the occupied space in the installation place.

Further, this embodiment can also provide an advantageous effect on an appearance of the holding device 1 by reducing the thickness of the base part 11, as explained below.

Figure 22:
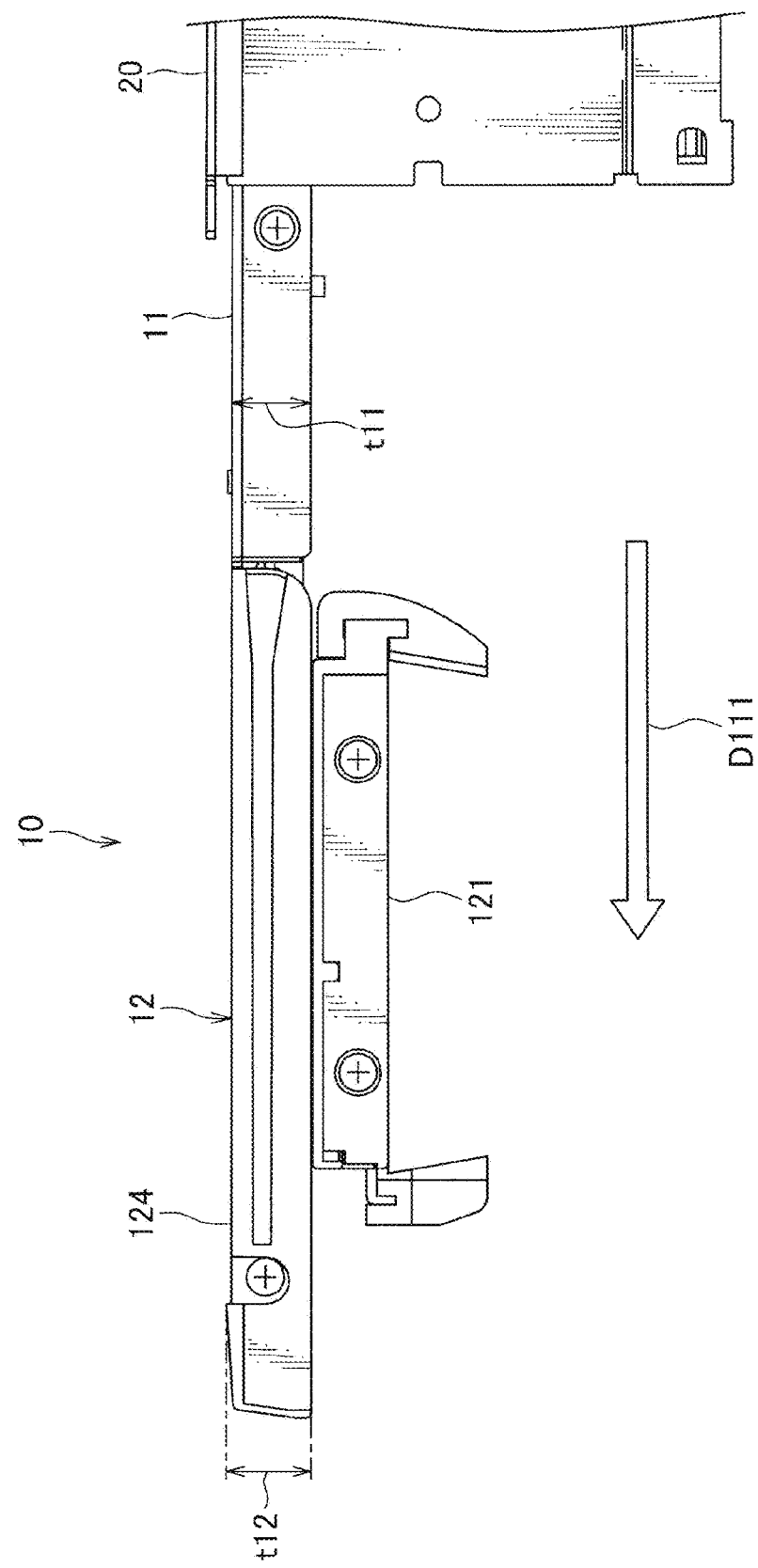
FIG. 22 is a side view of the holding mechanism shown to illustrate an advantageous effect on an appearance of the holding device which can be provided by reducing a thickness of the base part.

FIG. 22 is a side view of the holding mechanism shown to illustrate an advantageous effect on the appearance of the holding device which can be provided by reducing the thickness of the base part. FIG. 22 shows the state in which the holding mechanism 10 with the holding part 12 lied down and forming the single plate shape with the base part 11 is being drawn out from the device main body 20 in the projecting direction D111.

As shown in this FIG. 22, in this embodiment, by reducing the thickness of the base part 11, its thickness t11 is set to be substantially the same as a thickness t12 of a main plate part 124 of the holding part 12 excluding the chucking part 121.

FIG. 23 shows a front perspective view of the holding device shown to illustrate the advantageous effect on the appearance of the holding device which can be provided by reducing the thickness of the base part. In FIG. 23, the upper side shows the state in which the holding mechanism 10 is accommodated in the device main body 20, and the lower side shows the state in which the holding mechanism 10 is drawn out from the device main body 20 and the holding part 12 is erected. In FIG. 23, a flange shown in FIG. 1 and FIG. 2 that is provided on the front side of the device main body 20 and surrounding the front panel part 23 is omitted.

As shown in FIG. 23, the front panel part 23 is provided with a cutout 231 so as to avoid interfering with both of the holding mechanism 10 in the accommodated state and the holding mechanism 10 in the drawn-out state. In the accommodated state, a tip end of the main plate part 124 of the holding part 12 is accommodated in the cutout 231, and in the drawn-out state, the base part 11 passes through the cutout 231.

At this time, in the comparative example shown in FIG. 21, the thickness of the base part 61 needs to be thick to accommodate the moving distance A61 of the rotating end of the rotary body 631. As a result, it is required to provide a deep cutout to the front panel part 23 to avoid interference with the thickened base part 61. On the other hand, for the holding part not shown, assuming it has a shape similar to that of this embodiment, there would be a gap between an inner periphery of the cutout and the main plate part of the holding part that is thinner than the base part 61 in the accommodated state. Such gap is undesirable in appearance.

In contrast, in this embodiment, since the thickness t11 of the base part 11 is set to be substantially the same as the thickness t12 of the main plate part 124 of the holding part 12 as described above, the gap such as the one produced in the above comparative example can be prevented, thereby obtaining a good appearance.

In the holding device 1 of this embodiment, the projection lock part 13 as described above includes the projection locking torsion spring 135 that biases the engagement part 131 to the engaged position. Consequently, for example during use in which the smartphone 5 is held and used, the engagement part 131 is always biased and engaged to the device main body 20, thus the smartphone 5 can be used in a stable state.

Further, in this embodiment, when the engagement part 131 is moved to the disengaged position against the above-described biasing force, the first rotary body 132 exerts a force on and rotates the second rotary body 133. On the other hand, it rotates so as not to obstruct the rotation of the second rotary body 133 when the engagement part 131 is moved to the engaged position. Consequently, since the biasing force is used for the movement of the engagement part 131 to the engaged position, the consideration only needs to be given to move the engagement part 131 to the disengaged position regarding the transmission of the force to the engagement part 131 by the first rotary body 132 and the second rotary body 133. Consequently, the mechanism configuration regarding the transmission of the force can be simplified, thereby reducing the cost and labor for manufacturing and assembling the holding device 1.

Further, in this embodiment, the device main body 20 is provided with the rack 212*b* extending in the projecting and retracting direction D11 of the holding mechanism 10, and the engagement part 131 is configured to engage to the rack 212*b* having the linearly-arranged serrated teeth 212*b*-1. In this embodiment, the length direction of this rack 212*b* is arranged to match with the projecting and retracting direction D11 of the holding mechanism 10, thereby reducing the accommodation space also for the engagement mechanism of the engagement part 131 of the holding device 1. Consequently, the holding device 1 is further downsized.

Further, this embodiment further includes the accommodation lock part 14 for locking the holding mechanism 10 that has been retracted into the device main body 20 to the accommodated position. Consequently, the holding mechanism 10 can be stably accommodated to the accommodated position.

Further, in this embodiment, the holding mechanism 10 includes the base part 11 and the holding part 12 pivotally supported on the base part 11. The engagement part 131 is moved by the rotation of the first rotary body 132 and the second rotary body 133 in association with the rotating operation for rotating the holding part 12 with respect to the base part 11. In this manner, the operation by the user to make the smartphone 5 held, which is the rotation of the holding part 12, is used as the operation for locking and unlocking by the movement of the engagement part 131. Consequently, as compared to the case of, for example, separately providing an operation button and such for achieving locking and unlocking, the manufacturing cost can be reduced due to the reduction in the number of components and such.

The present invention is not limited to the embodiment described above, it may include other configurations and such capable of achieving the object of the present invention, thus modifications and such as described below are also within the present invention.

For example, in the embodiment described above, the holding device 1 as vehicle-borne device configured to be mounted on the instrumental panel in use is exemplary shown as one example of the holding device of the present invention. However, the holding device of the present invention may not be limited to the vehicle-borne device, it may be a device such as the one configured to be placed on a table in use. Moreover, it may be the vehicle-borne device but not limited to be the one configured to be mounted on the instrumental panel in use, it may be the one configured to be installed at any location capable of being operated by a passenger in use.

Further, in the embodiment described above, the holding device 1 in which a held object is a smartphone that is one example of a mobile device, is shown as one example of the holding device of the present invention. However, the holding device of the present invention is not limited to this, it may be a device in which a held object is other than the mobile device, such as a paper map or a book, as long as it is configured to hold the held object. Further, regarding the mobile device, it is not limited to a smartphone as this embodiment, it may be a tablet terminal or a game device and such, for example.

Further, in the embodiment described above, the projection lock part 13 having two rotary bodies including the first rotary body 132 and the second rotary body 133 configured to directly receive a force from this rotary body 132, is exemplary shown as one example of the lock part of the present invention. However, the lock part of the present invention is not limited to this, it may include another rotary body or a mechanism member other than a rotary body interposed between the first rotary body and the second rotary body. In this case, the second rotary body indirectly receives a force via the interposed component between the first rotary body and the second rotary body.

Further, in the embodiment described above, the projection lock part 13 including the projection locking torsion spring 135 configured to bias the engagement part 131 to the engaged position, is exemplary shown as one example of the lock part of the present invention. However, the lock part of the present invention is not limited to this, it may include a biasing member configured to bias the engagement part in a direction away from the engaged position.

Further, in the embodiment described above, the rotating operation configured to rotate the holding part 12 of the holding mechanism 10 with respect to the base part 11 is exemplary shown as one example of certain operation of the present invention. However, the certain operation of the present invention is not limited to this, it may be operation different from the rotating operation of the holding part, such as a button operation or a lever operation.

Preferred configurations, methods and such for implementing the present invention have been disclosed in the above description, however the present invention is not limited to these. That is, a person skilled in the art can make various modifications with respect to shape, material, number and/or other detailed configurations of the present invention. Description that may limit the shape, material and such disclosed herein are used for the illustrative purpose only to enhance understanding of the present invention. Thus, the description is not intended to limit the present invention, and therefore, description using name of a member without such limitation, either entire limitation or a part of limitation, regarding the shape, material and such, are also within the present invention.

LIST OF REFERENCE SIGNS 1 holding device
5 smartphone (held object)
10 holding mechanism
11 base part
12 holding part
12a one end
12b another end
13 projection lock part (lock part)
14 accommodation lock part (second lock part)
15 torque hinge
20 device main body
20a housing
21 upper chassis
22 lower chassis
23 front panel part
24 panel part
111 end
112, 512 protruding member
112a, 512a protrusion
112b, 512b sheet metal
113 accommodation lock rotation shaft
114 base part side sheet metal frame
115 projection locking first rotation shaft
116 projection locking second rotation shaft
121 chucking part
122 holding claw
123 holding side sheet metal frame
123a switching part
131 engagement part
131a protrusion
131b rotating route
132 first rotary body
132a tip end
132b inclined face
132c recessed part
132d intersection face
133 second rotary body
134 backlash suppressing torsion spring
135 projection locking torsion spring
141 lock lever
141a engagement hook
142 accommodation lock torsion spring
151 rotation shaft
211 upper face part
211a guide groove
211b central region
212 slide supporting part
212a support groove
212b rack
212b-1 serrated teeth
213 engagement protrusion
221 back base plate
222 inner base plate
223 cable
231 shaft protrusion
241 holding arm
D11 projecting and retracting direction
D12, D14 rotating direction
D15 right and left direction
D17 disengaging direction
D18 engaging direction
D19 backlash suppressing biasing direction
D20 projection locking biasing direction
D21, D23 arrow
D22 disengaging direction
D24 extending direction
D25 moving direction
D111 projecting direction
D112 retracting direction
D121 erecting direction
D131 raising direction
D132 descending direction
D141 clockwise rotating direction
D161 accommodation lock biasing direction
D162 move-over rotating direction
F11, F51 first resistance force
F12, F52 second resistance force
$\theta 11$ inclination angle on the projecting side
$\theta 12$ inclination angle on the retracting side
$\theta 13$ inclination angle
$\theta 14$ approaching angle

The invention claimed is:

1. A holding device in which a holding mechanism having a holding part for holding a held object is supported on a device main body so as to slidably project and retract, the holding device comprising:
a lock part mounted on the holding mechanism and configured to lock the holding mechanism at an arbitrary projected position,
the device main body being provided with a to-be-engaged body including a plurality of to-be-engaged parts arranged in a projecting and retracting direction of the holding mechanism,
wherein the lock part includes
a first rotary body pivotally supported on the holding mechanism and configured to rotate by application of an erecting operation, the erecting operation being operation to erect the holding part,
a second rotary body configured to rotate by a force directly or indirectly applied from the first rotary body by the rotation of the first rotary body, and
an engagement part configured to move, by the rotation of the second rotary body, between an engaged position at which the engagement part is engaged to the to-be-engaged part so as to be engaged to one of the plurality of to-be-engaged parts of the to-be-engaged body of the device main body and a disengaged position in which the engagement part is separated from the to-be-engaged part to be disengaged, wherein,
the lock part locks the holding mechanism with the engagement part being moved to the engaged position and unlocks the holding mechanism with the engagement part being moved to the disengaged position, and
the engagement part moves to the engaged position by the erecting operation.

2. The holding device as claimed in claim 1, wherein the holding mechanism includes
a base part supported on the device main body so as to slidably project and retract, wherein,
the holding part is pivotally supported on the base part and is configured to hold the held object,
the holding part is rotated with respect to the base part by the erecting operation and a lying operation, the lying operation being operation to make the holding part lied down, and the engagement part is moved to the engaged position by the erecting operation and is moved to the disengaged position by the lying operation.

3. The holding device as claimed in claim 1, wherein the device main body is configured to be mounted on a vehicle.

4. The holding device as claimed in claim 1, wherein the held object is a mobile device.

5. The holding device as claimed in claim 1, further comprising a second lock part provided to the device main body and configured to lock the holding mechanism that has been retracted in the device main body to an accommodated position.

6. The holding device as claimed in claim 5, wherein the holding mechanism includes
a base part supported on the device main body so as to slidably project and retract, wherein,
the holding part is pivotally supported on the base part and is configured to hold the held object,
the holding part is rotated with respect to the base part by the erecting operation and a lying operation, the lying operation being operation to make the holding part lied down, and
the engagement part is moved to the engaged position by the erecting operation and is moved to the disengaged position by the lying operation.

7. The holding device as claimed in claim 1, wherein the lock part further includes a biasing member configured to bias the engagement part to the engaged position.

8. The holding device as claimed in claim 7, further comprising a second lock part provided to the device main body and configured to lock the holding mechanism that has been retracted in the device main body to an accommodated position.

9. The holding device as claimed in claim 7, wherein the holding mechanism includes
a base part supported on the device main body so as to slidably project and retract, wherein,
the holding part is pivotally supported on the base part and is configured to hold the held object,
the holding part is rotated with respect to the base part by the erecting operation and a lying operation, the lying operation being operation to make the holding part lied down, and
the engagement part is moved to the engaged position by the erecting operation and is moved to the disengaged position by the lying operation.

10. The holding device as claimed in claim 7, wherein the device main body is configured to be mounted on a vehicle.

11. The holding device as claimed in claim 7, wherein the first rotary body is configured to,
when moving the engagement part to the disengaged position against a biasing force of the biasing member, make the second rotary body rotated by applying a force to the second rotary body by the rotation of the first rotary body, and,
when the engagement part moves to the engaged position by the biasing force, rotate so as not to obstruct the rotation of the second rotary body by the biasing force applied via the engagement part.

12. The holding device as claimed in claim 11, further comprising a second lock part provided to the device main body and configured to lock the holding mechanism that has been retracted in the device main body to an accommodated position.

13. The holding device as claimed in claim 11, wherein the holding mechanism includes
a base part supported on the device main body so as to slidably project and retract, wherein,
the holding part is pivotally supported on the base part and is configured to hold the held object,
the holding part is rotated with respect to the base part by the erecting operation and a lying operation, the lying operation being operation to make the holding part lied down, and
the engagement part is moved to the engaged position by the erecting operation and is moved to the disengaged position by the lying operation.

14. The holding device as claimed in claim 11, wherein the device main body is configured to be mounted on a vehicle.

* * * * *